United States Patent
Ren et al.

(10) Patent No.: US 12,495,007 B2
(45) Date of Patent: Dec. 9, 2025

(54) METHOD FOR SENDING DATA PACKET AND NETWORK DEVICE

(71) Applicant: HUAWEI TECHNOLOGIES CO., LTD., Guangdong (CN)

(72) Inventors: Shoushou Ren, Beijing (CN); Bingyang Liu, Shenzhen (CN); Rui Meng, Beijing (CN); Chuang Wang, Shenzhen (CN); Jean-Yves Leboudec, Lausanne (CH); Ehsan Mohanmmadpour, Lausanne (CH); Alaeddine Elfawal, Lausanne (CH)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 454 days.

(21) Appl. No.: 18/159,875

(22) Filed: Jan. 26, 2023

(65) Prior Publication Data

US 2023/0171201 A1    Jun. 1, 2023

Related U.S. Application Data

(63) Continuation of application No. PCT/CN2021/104191, filed on Jul. 2, 2021.

(30) Foreign Application Priority Data

Jul. 31, 2020  (CN) .................... 202010760188.5

(51) Int. Cl.
*H04L 47/56*  (2022.01)
*H04L 47/6275*  (2022.01)
*H04L 49/00*  (2022.01)

(52) U.S. Cl.
CPC .......... *H04L 47/56* (2013.01); *H04L 47/6275* (2013.01); *H04L 49/3018* (2013.01); *H04L 49/3027* (2013.01)

(58) Field of Classification Search
CPC . H04L 47/56; H04L 47/6275; H04L 49/3018; H04L 49/3027
See application file for complete search history.

(56) References Cited

U.S. PATENT DOCUMENTS 9,584,431 B2 *   2/2017   Szymanski .............. H04L 47/30
2010/0284274 A1  11/2010  Ghanadan et al.
(Continued)

FOREIGN PATENT DOCUMENTS

CN    106921586 A    7/2017
CN    108282415 A    7/2018
(Continued)

OTHER PUBLICATIONS

Lianming Zhang et al.,"Bounds on End-to-End Delay Jitter with Self-Similar Input Traffic in Ad Hoc Wireless Network",Aug. 3-4, 2008, total:4pages.

*Primary Examiner* — Melanie Jagannathan
(74) *Attorney, Agent, or Firm* — WOMBLE BOND DICKINSON (US) LLP

(57) ABSTRACT

Embodiments of this application provide a method for sending a data packet. The method includes: A second network device may determine a remaining processing time of a data packet on a first network device based on a predefined first delay. When the remaining processing time is greater than 0, a moment at which the data packet enters a queue on the second network device serves as a start moment, and after a period of time, the remaining processing time ends at a second reference moment corresponding to the data packet. The remaining processing time is consumed on the second network device.

20 Claims, 12 Drawing Sheets

(56) References Cited

U.S. PATENT DOCUMENTS

| | | |
|---|---|---|
| 2013/0022042 A1 | 1/2013 | Vasseur et al. |
| 2014/0177443 A1* | 6/2014 | Nishimura .............. H04L 47/56 370/235.1 |
| 2015/0078395 A1* | 3/2015 | Nishimura .............. H04L 47/32 370/412 |
| 2015/0222970 A1 | 8/2015 | Kanonakis |
| 2018/0115493 A1 | 4/2018 | Van Leekwijck et al. |
| 2022/0278765 A1* | 9/2022 | Harada ................... H04L 47/56 |
| 2023/0171198 A1* | 6/2023 | Oge ........................ H04L 47/56 370/429 |

FOREIGN PATENT DOCUMENTS

| | | |
|---|---|---|
| CN | 110086728 A | 8/2019 |
| CN | 111416779 A | 7/2020 |
| CN | 114095397 A | 2/2022 |
| CN | 114095453 A | 2/2022 |
| CN | 114095454 A | 2/2022 |
| EP | 3720069 A1 | 10/2020 |
| WO | 2019127597 A1 | 7/2019 |

\* cited by examiner

METHOD FOR SENDING DATA PACKET AND NETWORK DEVICE

CROSS-REFERENCE TO RELATED APPLICATIONS

This application is a continuation of International Application No. PCT/CN2021/104191, filed on Jul. 2, 2021, which claims priority to Chinese Patent Application No. 202010760188.5, filed on Jul. 31, 2020. The disclosures of the aforementioned applications are hereby incorporated by reference in their entireties.

TECHNICAL FIELD

This application relates to the field of communication technologies, and more specifically, to a method for sending a data packet and a network device.

BACKGROUND

A deterministic delay means that a delay and a jitter experienced by a data packet in transmission meet an upper bound under the premise that the data packet complies with a specific burst requirement. To meet an end-to-end deterministic delay and jitter of a data packet, scalable data plane deterministic data packet scheduling needs to be implemented.

None of existing scheduling methods (for example, a weighted fair queue and cyclic queuing and forwarding (CAF)) can meet a requirement for a deterministic delay.

SUMMARY

This application provides a method for sending a data packet and a network device, to ensure an end-to-end deterministic delay and jitter of a network in different network scenarios.

According to a first aspect, a method for sending a data packet is provided, where the method includes:
a second network device receives, at a first moment, a data packet sent by a first network device;
the second network device determines a second reference moment based on time information carried in the data packet, where the second reference moment is a reference moment for instructing the data packet to enter a queue in a second queue system, the second queue system is a queue system of the second network device, the time information is used to indicate a first remaining processing time for the data packet to pass the first network device, the first remaining processing time is a difference between a first delay and a first processing time, the first delay is a value not less than an absolute value of a difference between a first theoretical upper time limit and a first transmission time, the first theoretical upper time limit is a theoretical upper processing time limit from a first reference moment to the second reference moment, the first reference moment is a reference moment for instructing the data packet to enter a queue in a first queue system, the first queue system is a queue system of the first network device, the first transmission time is an actual transmission time from a first output moment at which the data packet is output by the first network device to the first moment, and the first processing time is an actual processing time from the first reference moment to the first output moment at which the data packet is output by the first network device;
the second network device determines, based on the second reference moment, a target queue from a plurality of queues included in the second queue system, and adds the data packet to the target queue; and
the second network device sends the data packet to a third network device according to a scheduling rule corresponding to the second queue system.

In the foregoing technical solution, the second network device determines the remaining processing time of the data packet on the first network device based on the predefined first delay. When the remaining processing time is greater than 0, a moment at which the data packet enters a queue (that is, an example of the target queue) on the second network device serves as a start moment, and after a period of time, the remaining processing time ends at a second reference moment corresponding to the data packet. The remaining processing time is consumed on the second network device. Therefore, a deterministic delay and jitter of the data packet after the data packet is forwarded by the first network device and the second network device can be ensured, so that a shape of a stream, in which the data packet is located, that enters the second network device is the same as a shape of a stream, in which the data packet is located, that is output by the second network device.

In an embodiment, the plurality of queues included in the second queue system are in a one-to-one correspondence with a plurality of preset moments, a difference between any two adjacent preset moments of the plurality of preset moments is a first value, and that the second network device determines, based on the second reference moment, a target queue from a plurality of queues included in the second queue system includes:
the second network device determines, based on the second reference moment, that one queue corresponding to a first target moment among the plurality of queues included in the second queue system is the target queue, where the first target moment is a sum of the second reference moment and a second value, the second value is an absolute value of a difference between the second reference moment and a third moment plus an integer multiple of the first value, any one of the plurality of preset moments is not included between the second reference moment and the third moment, the third moment is one moment of the plurality of preset moments, the third moment is later than the second reference moment, and the first target moment is one moment of the plurality of preset moments.

In an embodiment, that the second network device determines a second reference moment based on time information carried in the data packet includes:
the second network device determines the second reference moment based on the first delay and the first processing time.

In an embodiment, that the second network device determines the second reference moment based on the first delay and the first processing time includes:
the second network device determines the second reference moment based on the first delay, the first reference moment, the first output moment at which the data packet is output by the first network device, and the first moment.

In an embodiment, that the second network device determines the second reference moment based on the first delay, the first reference moment, the first output moment at which the data packet is output by the first network device, and the first moment includes: the second network device determines the second reference moment based on the following formula:

$$E^2 = t_{in}^2 + D_1^{max} - (t_{out}^1 - E^1),$$

where
$E^2$ is the second reference moment, $t_{in}^2$ is the first moment, $D_1^{max}$ is the first delay, $t_{out}^1$ is the first output moment at which the data packet is output by the first network device, and $E^1$ is the first reference moment.

In an embodiment, that the second network device determines the second reference moment based on the first delay and the first processing time includes:
  the second network device determines the second reference moment based on the first delay, the first reference moment, the first output moment at which the data packet is output by the first network device, a moment at which a switch fabric of the second network device completes processing the data packet, and the first moment, where the moment at which the switch fabric of the second network device completes processing the data packet is earlier than the second reference moment.

In an embodiment, that the second network device determines the second reference moment based on the first delay, the first reference moment, the first output moment at which the data packet is output by the first network device, a moment at which a switch fabric of the second network device completes processing the data packet, and the first moment includes: the second network device determines the second reference moment based on the following formula:

$$E^2 = t_{in}^{'2} + [D_1^{max} - (t_{out}^1 - E^1)] - (t_{in}^{'2} - t_{in}^2),$$

where
$E^2$ is the second reference moment, $t_{in}^{'2}$ is the moment at which the switch fabric of the second network device completes processing the data packet, $D_1^{max}$ is the first delay, $t_{out}^1$ is the first output moment at which the data packet is output by the first network device, $E^1$ is the first reference moment, and $t_{in}^2$ is the first moment.

In an embodiment, the time information includes a first time value, and the first time value is the first remaining processing time.

In an embodiment, the time information includes first indication information, and the first indication information is used to indicate the first processing time.

In an embodiment, the first indication information includes a second time value, and the second time value is the first processing time.

In an embodiment, the first indication information includes a third time value and a fourth time value, the third time value is the first output moment at which the data packet is output by the first network device, and the fourth time value is the first reference moment.

In an embodiment, the time information further includes second indication information, and the second indication information is used to indicate the first delay.

In an embodiment, that the second network device sends the data packet to a third network device according to a scheduling rule corresponding to the second queue system includes:
  the second network device determines that the target queue is a queue scheduled at a current moment among the plurality of queues included in the second queue system and that the target queue is in an enabled state, and the second network device sends the data packet to the third network device.

In an embodiment, the method further includes:
  when the target queue meets a first preset condition, the second network device determines to disable the target queue.

In an embodiment, after the second network device determines to disable the target queue, the method further includes:
  the second network device determines a second target moment based on first information, where the second target moment corresponds to the target queue, the second target moment is an enabling moment that corresponds to the target queue and that is later than the first target moment, the second target moment is later than any one of the plurality of preset moments, and the first information includes a scheduling order corresponding to each queue included in the second queue system and an enabling moment corresponding to each queue included in the second queue system; and
  the plurality of queues included in the second queue system are in a one-to-one correspondence with the plurality of preset moments, the difference between any two adjacent preset moments of the plurality of preset moments is the first value, the one queue corresponding to the first target moment among the plurality of queues included in the second queue system is the target queue, the first target moment is the sum of the second reference moment and the second value, the second value is the absolute value of the difference between the second reference moment and the third moment plus the integer multiple of the first value, any one of the plurality of preset moments is not included between the second reference moment and the third moment, the third moment is one moment of the plurality of preset moments, the third moment is later than the second reference moment, and the first target moment is one moment of the plurality of preset moments.

In an embodiment, that the second network device determines that the target queue is a queue scheduled at a current moment among the plurality of queues included in the second queue system includes:

when the second network device determines that the target queue is a queue with a highest priority among the plurality of queues included in the second queue system, the second network device determines that the target queue is the queue scheduled at the current moment among the plurality of queues included in the second queue system; and after the second network device determines to disable the target queue, the method further includes:

the second network device sets a priority of the target queue to a queue with a lowest priority among the plurality of queues included in the second queue system, and increases a priority of a queue other than the target queue among the plurality of queues included in the second queue system.

In an embodiment, the plurality of queues included in the second queue system are in a one-to-one correspondence with a plurality of preset scheduling orders; and that the second network device determines that the target queue is a queue scheduled at a current moment among the plurality of queues included in the second queue system includes:

when the second network device determines, according to the plurality of preset scheduling orders, that a preset scheduling order corresponding to the target queue is a scheduling order corresponding to the queue scheduled by the second network device at the current moment, the second network device determines that the target queue is the queue scheduled at the current moment among the plurality of queues included in the second queue system.

In an embodiment, the first preset condition includes: the target queue is an empty queue, enabled duration of the target queue is greater than or equal to the first value, the first value is the difference between any two adjacent preset moments of the plurality of preset moments, and the plurality of preset moments are in a one-to-one correspondence with the plurality of queues included in the second queue system.

According to a second aspect, a second network device is provided, where the second network device includes:

a transceiver unit, configured to receive, at a first moment, a data packet sent by a first network device; and a processing unit, configured to determine a second reference moment based on time information carried in the data packet, where the second reference moment is a reference moment for instructing the data packet to enter a queue in a second queue system, the second queue system is a queue system of the second network device, the time information is used to indicate a first remaining processing time for the data packet to pass the first network device, the first remaining processing time is a difference between a first delay and a first processing time, the first delay is a value not less than an absolute value of a difference between a first theoretical upper time limit and a first transmission time, the first theoretical upper time limit is a theoretical upper processing time limit from a first reference moment to the second reference moment, the first reference moment is a reference moment for instructing the data packet to enter a queue in a first queue system, the first queue system is a queue system of the first network device, the first transmission time is an actual transmission time from a first output moment at which the data packet is output by the first network device to the first moment, and the first processing time is an actual processing time from the first reference moment to the first output moment at which the data packet is output by the first network device; where the processing unit is further configured to determine, based on the second reference moment, a target queue from a plurality of queues included in the second queue system, and adds the data packet to the target queue; and the processing unit is further configured to send the data packet to a third network device according to a scheduling rule corresponding to the second queue system.

In the foregoing technical solution, the second network device determines the remaining processing time of the data packet on the first network device based on the predefined first delay. When the remaining processing time is greater than 0, a moment at which the data packet enters a queue (that is, an example of the target queue) on the second network device serves as a start moment, and after a period of time, the remaining processing time ends at a second reference moment corresponding to the data packet. The remaining processing time is consumed on the second network device. Therefore, a deterministic delay and jitter of the data packet after the data packet is forwarded by the first network device and the second network device can be ensured, so that a shape of a stream, in which the data packet is located, that enters the second network device is the same as a shape of a stream, in which the data packet is located, that is output by the second network device.

In an embodiment, the plurality of queues included in the second queue system are in a one-to-one correspondence with a plurality of preset moments; and the processing unit is further configured to:

determine, based on the second reference moment, that one queue corresponding to a first target moment among the plurality of queues included in the second queue system is the target queue, where the first target moment is a sum of the second reference moment and a second value, the second value is an absolute value of a difference between the second reference moment and a third moment plus an integer multiple of the first value, any one of the plurality of preset moments is not included between the second reference moment and the third moment, the third moment is one moment of the plurality of preset moments, the third moment is later than the second reference moment, and the first target moment is one moment of the plurality of preset moments.

In an embodiment, the processing unit is further configured to:

determine the second reference moment based on the first delay and the first processing time.

In an embodiment, the processing unit is further configured to:
determine the second reference moment based on the first delay, the first reference moment, the first output moment at which the data packet is output by the first network device, and the first moment.

In an embodiment, the processing unit is further configured to:
determine the second reference moment based on the following formula:

$$E^2 = t_{in}^2 + D_1^{max} - (t_{out}^1 - E^1),$$

where
$E^2$ is the second reference moment, $$t_{in}^2$$

is the first moment, $$D_1^{max}$$

is the first delay, $$t_{out}^1$$

is the first output moment at which the data packet is output by the first network device, and $E^1$ is the first reference moment.

In an embodiment, the processing unit is further configured to:
determine the second reference moment based on the first delay, the first reference moment, the first output moment at which the data packet is output by the first network device, a moment at which a switch fabric of the second network device completes processing the data packet, and the first moment, where the moment at which the switch fabric of the second network device completes processing the data packet is earlier than the second reference moment.

In an embodiment, the processing unit is further configured to:
determine the second reference moment based on the following formula:

$$E^2 = t_{in}'^2 + [D_1^{max} - (t_{out}^1 - E^1)] - t_{in}'^2 - t_{in}^2),$$

where
$E^2$ is the second reference moment, $$t_{in}'^2$$

is the moment at which the switch fabric of the second network device completes processing the data packet, $$D_1^{max}$$

is the first delay, $$t_{out}^1$$

is the first output moment at which the data packet is output by the first network device, $E^1$ is the first reference moment, and $$t_{in}^2$$

is the first moment.

In an embodiment, the time information includes a first time value, and the first time value is the first remaining processing time.

In an embodiment, the time information includes first indication information, and the first indication information is used to indicate the first processing time.

In an embodiment, the first indication information includes a second time value, and the second time value is the first processing time.

In an embodiment, the first indication information includes a third time value and a fourth time value, the third time value is the first output moment at which the data packet is output by the first network device, and the fourth time value is the first reference moment.

In an embodiment, the time information further includes second indication information, and the second indication information is used to indicate the first delay.

In an embodiment, the processing unit is further configured to:
determine that the target queue is a queue scheduled at a current moment among the plurality of queues included in the second queue system and that the target queue is in an enabled state; and
the transceiver unit is further configured to send the data packet to the third network device according to the scheduling rule corresponding to the second queue system.

In an embodiment, the processing unit is further configured to:
when the target queue meets a first preset condition, determine to disable the target queue.

In an embodiment, a second target moment is determined based on first information, where the second target moment corresponds to the target queue, the second target moment is an enabling moment that corresponds to the target queue and that is later than the first target moment, the second target moment is later than any one of the plurality of preset moments, and the first information includes a scheduling order corresponding to each queue included in the second queue system and an enabling moment corresponding to each queue included in the second queue system; and
the plurality of queues included in the second queue system are in a one-to-one correspondence with the plurality of preset moments, the difference between any two adjacent preset moments of the plurality of preset moments is the first value, the one queue corresponding to the first target moment among the plurality of queues included in the second queue system is the target queue, the first target moment is the sum of the second reference moment and the second value, the second value is the absolute value of the difference between the second reference moment and the third moment plus the integer multiple of the first value, any one of the plurality of preset moments is not included between the second reference moment and the third moment, the third moment is one moment of the plurality of preset moments, the third moment is later than the second reference moment, and the first target moment is one moment of the plurality of preset moments.

In an embodiment, the processing unit is further configured to:

when determining that the target queue is a queue with a highest priority among the plurality of queues included in the second queue system, determine that the target queue is the queue scheduled at the current moment among the plurality of queues included in the second queue system; and set a priority of the target queue to a queue with a lowest priority among the plurality of queues included in the second queue system, and increase a priority of a queue other than the target queue among the plurality of queues included in the second queue system.

In an embodiment, the plurality of queues included in the second queue system are in a one-to-one correspondence with a plurality of preset scheduling orders; and the processing unit is further configured to:

when determining, according to the plurality of preset scheduling orders, that a preset scheduling order corresponding to the target queue is a scheduling order corresponding to the queue scheduled by the second network device at the current moment, determine that the target queue is the queue scheduled at the current moment among the plurality of queues included in the second queue system.

In an embodiment, the first preset condition includes: the target queue is an empty queue, enabled duration of the target queue is greater than or equal to the first value, the first value is the difference between any two adjacent preset moments of the plurality of preset moments, and the plurality of preset moments are in a one-to-one correspondence with the plurality of queues included in the second queue system.

According to a third aspect, a second network device is provided. The second network device includes a memory and a processor. The memory is configured to store computer executable instructions. The processor is configured to read the computer executable instructions stored in the memory, so that the second network device performs the method in any one of the first aspect or the possible implementations of the first aspect.

According to a fourth aspect, a processor is provided, including an input circuit, an output circuit, and a processing circuit. The processing circuit is configured to receive a signal by using the input circuit, and transmit a signal by using the output circuit, so that the method in any one of the first aspect or the possible implementations of the first aspect is implemented.

In an embodiment, the processor may be a chip system, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in embodiments of this application.

According to a fifth aspect, a processing apparatus is provided, including a processor and a memory. The processor is configured to read computer executable instructions stored in the memory, and may receive a signal by using a receiver, and transmit a signal by using a transmitter, to perform the method in any one of the first aspect or the possible implementations of the first aspect.

In an embodiment, there are one or more processors, and there are one or more memories.

In an embodiment, the memory may be integrated into the processor, or the memory and the processor are separately disposed.

In a specific implementation process, the memory may be a non-transitory memory, for example, a read-only memory (ROM). The memory and the processor may be integrated into a same chip system, or may be disposed on different chip systems. A type of the memory and a manner in which the memory and the processor are disposed are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to a transmitter, and input data received by the processor may be from a receiver. The transmitter and the receiver may be collectively referred to as a transceiver.

According to a sixth aspect, a computer-readable storage medium is provided, configured to store a computer program. The computer program includes computer executable instructions used to perform the method in any one of the first aspect or the possible implementations of the first aspect.

According to a seventh aspect, a computer program product including computer executable instructions is provided. When the computer program product is run on a computer, the computer is enabled to perform the method in any one of the first aspect or the possible implementations of the first aspect.

According to an eighth aspect, a chip system is provided, including at least one processor and an interface. The at least one processor is configured to invoke and run a computer program, so that the chip system performs the method in any one of the first aspect or the possible implementations of the first aspect.

According to a ninth aspect, a system is provided, including the foregoing second network device.

DESCRIPTION OF EMBODIMENTS

Figure 1:
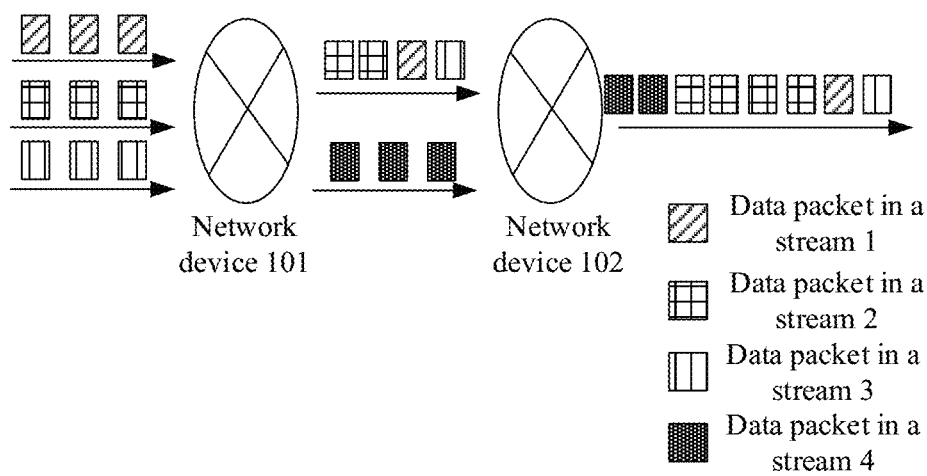
FIG. 1 is a schematic diagram of a cause of burst accumulation.

The following describes technical solutions of this application with reference to the accompanying drawings.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompany drawings. In addition, a combination of these solutions may be used.

In addition, words such as "example" or "for example" in embodiments of this application is used to represent giving an example, an illustration, or a description. Any embodiment or design scheme described as an "example" in this application should not be explained as being more preferred or having more advantages than another embodiment or design scheme. Specifically, the term "example" is used to present a concept in a specific manner.

In embodiments of this application, "relevant" and "corresponding" may be sometimes used interchangeably. It should be noted that expressed meanings are the same when differences are not emphasized.

In embodiments of this application, a subscript such as $W_1$ may be sometimes written in a non-subscript form such as W1 due to a clerical error. Expressed meanings are the same when differences are not emphasized.

A network architecture and a service scenario described in embodiments of this application are intended to describe the technical solutions in embodiments of this application more clearly, and do not constitute any limitation on the technical solutions provided in embodiments of this application. A person of ordinary skill in the art may know that with evolution of the network architecture and emergence of a new service scenario, the technical solutions provided in embodiments of this application are also applicable to similar technical problems.

Referring to "an embodiment" or "some embodiments" or the like in this specification means that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "comprise", "include", "have", and their variants all mean "include but are not limited to", unless otherwise specifically emphasized in another manner.

In this application, "at least one" means one or more, and "a plurality of" means two or more, "and/or" describes the association relationship between associated objects and represents that three relationships may exist. For example, A and/or B may represent the following cases: Only A exists, both A and B exist, and only B exists, where A and B may be singular or plural. The character "/" usually indicates an "or" relationship between associated objects. "At least one of the following items (pieces)" or a similar expression thereof refers to any combination of these items, including any combination of a singular item (piece) or plural items (pieces). For example, at least one item (piece) of a, b, and c may indicate: a, b, c, a and b, a and c, b and c, or a, b, and c, where a, b, and c may be singular or plural.

Burst Accumulation

In an internet protocol (IP) network, due to existence of burst accumulation, the internet protocol network cannot provide an end-to-end deterministic delay and jitter for a specific stream.

Burst accumulation is a root cause of a non-deterministic delay. A cause of burst accumulation is contention between different data packets.

FIG. 1 is a schematic diagram of a cause of burst accumulation.

As shown in FIG. 1, when three streams (a stream 1, a stream 2, and a stream 3) simultaneously arrive at a network device 101, the three streams are completely uniform. Because the network device 101 can process data packets only at a line rate, the stream 2 is subject to contention from the other two streams. As a result, two consecutive data packets are close to each other, increasing a burst degree. After the foregoing process is repeated for a plurality of times, a stream of a specific hop causes an unpredictable large burst. The large burst further causes contention to another stream, causing a delay of the another stream to increase and become unpredictable. Microburst hop-by-hop accumulation is a root cause of a non-deterministic delay. An existing method for resolving the foregoing problem either depends on time synchronization of devices in an entire network or has a limitation on a transmission distance, and therefore is hardly applicable to a large-scale IP network.

Figure 2:
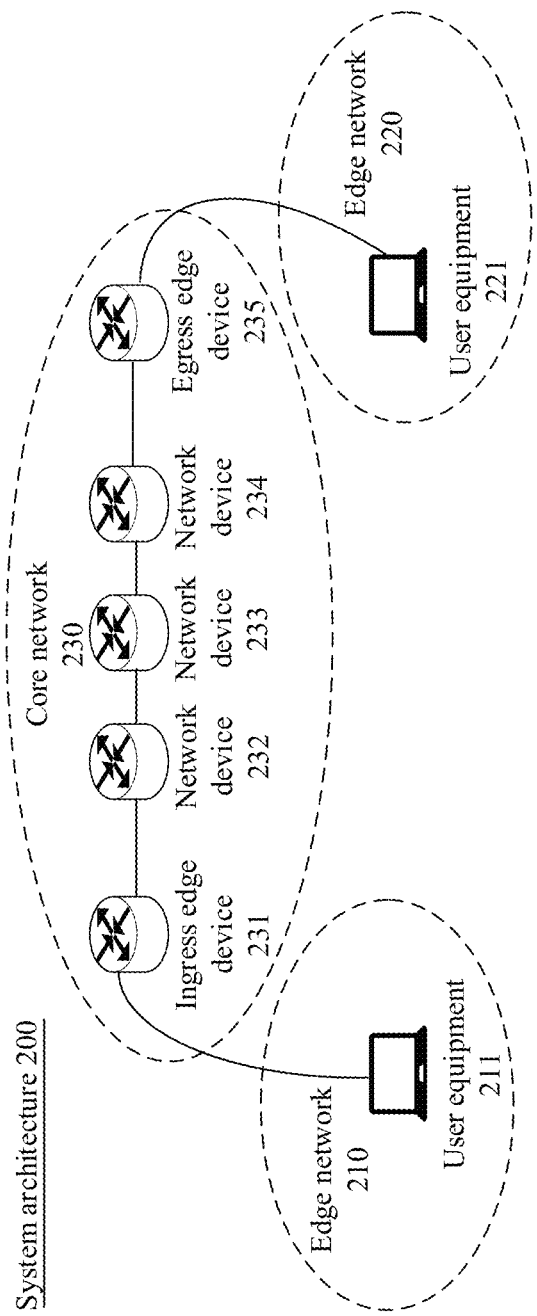
FIG. 2 is a schematic diagram of a system architecture 200 to which an embodiment of this application is applicable.

FIG. 2 is a schematic diagram of a system architecture 200 to which an embodiment of this application is applicable. As shown in FIG. 2, the system architecture 200 may include an edge network 210, an edge network 220, and a core network 230.

The edge network 210 includes user equipment 211. The edge network 220 includes user equipment 221. The core network 230 includes an ingress edge device 231, a network device 232, a network device 233, a network device 234, and an egress edge device 235.

As shown in FIG. 2, the user equipment 211 may communicate with the user equipment 221 by using the core network 230.

Embodiments of this application may be implemented by a device in the core network 230. For example, embodiments of this application may be implemented by the ingress edge device 231 and the network device 232, or may be implemented by the ingress edge device 231 to the egress edge device 235, or may be implemented by the network device 232 to the egress edge device 235.

An example in which the ingress edge device 231 to the egress edge device 235 implement a method in embodiments of this application is used below for description.

When the ingress edge device 231 is the $1^{st}$ network device at which a plurality of streams arrive when entering the core network 230, the ingress edge device 231 may also be referred to as a first-hop network device. In this case, the network device 232 is a second-hop network device, the network device 233 is a third-hop network device, the network device 234 is a fourth-hop network device, and the egress edge device 235 is a fifth-hop network device.

The ingress edge device 231 may receive a plurality of service streams. The ingress edge device 231 processes each of the plurality of service streams in a same manner. A traffic model of each service stream received by the ingress edge device 231 meets the following formula:

$$A_i(t)=r_i \times t+B_i, \text{ where}$$

t is a time, $A_i(t)$ is total data traffic of the $i^{th}$ service stream within the time t, $r_i$ is bandwidth required for the $i^{th}$ service stream, $B_i$ is a maximum burst degree of the $i^{th}$ service stream, and $r_i$ is average bandwidth, where the average bandwidth may be understood as an average speed of the $i^{th}$ service stream in a statistical sense.

The foregoing service stream may also be referred to as traffic sometimes.

When a target stream received by the ingress edge device 231 does not meet the foregoing traffic model, the ingress edge device 231 may shape the target stream by using an existing shaping algorithm (for example, a leaky bucket algorithm or a token bucket algorithm), so that a traffic model of a shaped target stream meets the foregoing traffic model.

A device capable of implementing embodiments of this application may be a router. Alternatively, a device capable of implementing embodiments of this application may be an ingress gateway device (for example, a switch).

It can be understood that FIG. 2 is merely a schematic diagram of a system architecture to help a person skilled in the art understand the method in this application, but is not a limitation on a system architecture to which technical solutions in this application are applicable. For example, in some implementations, the system architecture 200 may include more network devices. For example, in some implementations, the edge network 210 or the edge network 220 may further include more user equipments.

Figure 3:
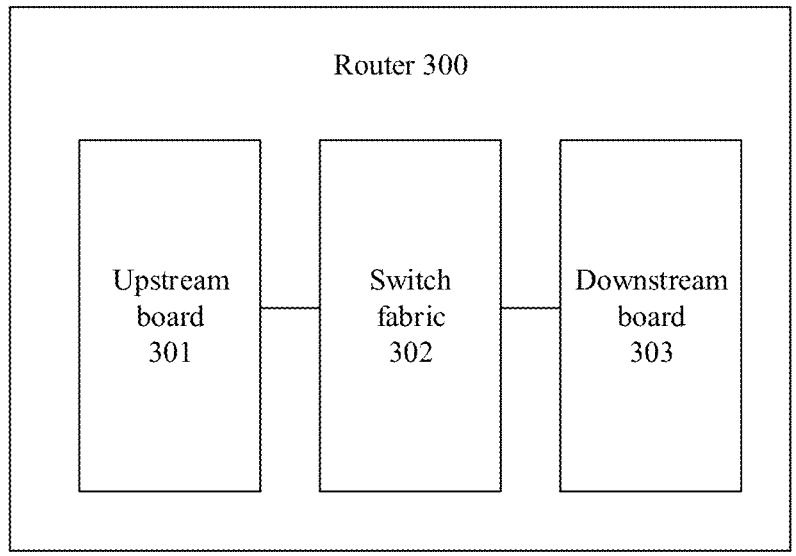
FIG. 3 is a schematic block diagram of a structure of a router capable of implementing an embodiment of this application.

FIG. 3 is a schematic block diagram of a structure of a router capable of implementing an embodiment of this application. As shown in FIG. 3, the router 300 includes an upstream board 301, a switch fabric 302, and a downstream board 303.

The upstream board may also be referred to as an upstream interface board. The upstream board 301 may include a plurality of input ports. The upstream board may perform processing, such as decapsulation, on a data packet received by the input port, and search for an output port by using a forwarding table. When an output port is found (for ease of description, the found output port is referred to as a target output port below), the data packet is sent to the switch fabric 302.

The switch fabric 302 forwards the received data packet to one target output port. Specifically, the switch fabric 302 forwards the received data packet to the downstream board 303 including the target output port. The downstream board may also be referred to as a downstream interface board. The downstream board 303 includes a plurality of output ports. The downstream board 303 receives the data packet from the switch fabric 302. The downstream board may perform processing, such as buffer management and encapsulation, on the received data packet, and then send the data packet to a next-hop network device through the target output port.

It can be understood that only one upstream board 301 and one downstream board 303 are shown in the router shown in FIG. 3. In some embodiments, the router may include a plurality of upstream boards and/or a plurality of downstream boards.

Figure 4:
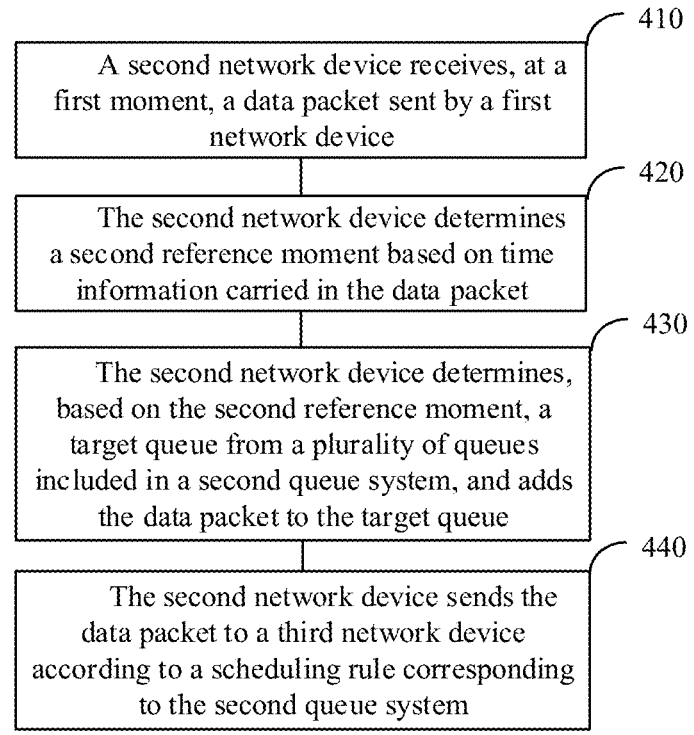
FIG. 4 is a schematic flowchart of a method 400 for sending a data packet according to an embodiment of this application.

FIG. 4 is a schematic flowchart of a method 400 for sending a data packet according to an embodiment of this application.

As shown in FIG. 4, the method 400 includes operation 410 to operation 440. The method 400 may be applied to the core network 230 shown in FIG. 2. Operation 410 to operation 440 are described in detail below.

Operation 410: A second network device receives, at a first moment, a data packet sent by a first network device.

A type of the network device is not specifically limited in this embodiment of this application. For example, the network device may be a switch or a router. Sometimes, the network device may also be referred to as a network node or a hop.

In this embodiment of this application, the second network device is a next-hop network device of the first network device.

As shown in FIG. 2, when the first network device is the ingress edge device 231, the second network device may be the network device 232. When the first network device is the network device 232, the second network device may be the network device 234. When the first network device is the network device 234, the second network device may be the egress edge device 235.

In an embodiment, before operation 410, the method may further include: The first network device receives a data packet. When the first network device is the $1^{st}$ network device that receives the data packet (that is, a first-hop device), the first network device may perform, by using an algorithm (for example, a leaky bucket algorithm), shaping processing on a service stream 1 in which the data packet received by the first network device is located, so that a shaped service stream 1 meets the following formula:

$$A_1(t) = r_1 \times t + B_1, \text{ where}$$

t is a time, $A_1(t)$ is total data traffic of the service stream 1 within the time t, $r_1$ is bandwidth required for the service stream 1, $B_1$ is a maximum burst degree of the service stream 1, and $r_1$ is average bandwidth, where the average bandwidth may be understood as an average speed of the service stream 1 in a statistical sense.

Operation 420: The second network device determines a second reference moment based on time information carried in the data packet.

In this embodiment of this application, the second reference moment is a reference moment for instructing the data packet to enter a queue in a second queue system, and the second queue system is a queue system of the second network device. In other words, the second network device may determine, based on the second reference moment, that the data packet should enter a specific queue in the second queue system.

The second queue system includes a group of queues, and the group of queues includes a plurality of queues. Sometimes, the second queue system may also be referred to as a second queue group.

In an embodiment, when priorities of services carried in a plurality of data packets received by the second network device are different, the second network device may further determine, based on a priority of a service carried in each data packet and service priorities corresponding to a plurality of queue systems included in the second network device, the second queue system from the plurality of queue systems. Service priorities corresponding to any two of the plurality of queue systems are different. One of service priorities corresponding to the second queue system is the same as a priority of a service carried in the data packet.

The plurality of queue systems may also be referred to as a plurality of queue groups, and each queue group may include a plurality of queues. Each queue group may correspond to one or more service priorities.

It is assumed that the second network device includes three queue systems, that is, a queue system 1, a queue system 2, and a queue system 3, the queue system 1 includes a queue 1 (corresponding to a service priority of 1) and a queue 2 (corresponding to a service priority of 2), the queue system 2 includes a queue 3 (corresponding to a service priority of 3), a queue 4 (corresponding to a service priority of 4), and a queue 5 (corresponding to a service priority of 5), and the queue system 3 includes a queue 6 (corresponding to a service priority of 6) and a queue 7 (corresponding to a service priority of 6). In this case, when the priority of the service carried in the data packet received by the second network device is 6, the second network device may determine that the queue system 3 is the second queue system.

In this embodiment of this application, the time information is used to indicate a first remaining processing time for the data packet to pass the first network device, the first remaining processing time is a difference between a first delay and a first processing time, the first delay is a value not less than an absolute value of a difference between a first theoretical upper time limit and a first transmission time, the first theoretical upper time limit is a theoretical upper processing time limit from a first reference moment to the second reference moment, the first reference moment is a reference moment for instructing the data packet to enter a queue in a first queue system, the first queue system is a queue system of the first network device, the first transmission time is an actual transmission time from a first output moment at which the data packet is output by the first network device to the first moment, and the first processing time is an actual processing time from the first reference moment to the first output moment at which the data packet is output by the first network device.

For ease of description, the "absolute value of the difference between the first theoretical upper time limit and the first transmission time" is denoted as a first absolute value herein.

In some implementations, that the first delay is a value not less than the first absolute value may be understood as that any value greater than or equal to the first absolute value may be selected as the first delay. For example, when the first absolute value is 10 microseconds, the first delay may be set to 10 microseconds, 11 microseconds, 20 microseconds, or 50 microseconds.

In some other implementations, that the first delay is a value not less than the first absolute value may be understood as that a sum of a non-negative integer and the first absolute value may be used as the first delay. For example, when the first absolute value is 10 microseconds and the non-negative integer is 1.5 microseconds, the first delay may be set to 11.5 microseconds.

The first theoretical upper time limit is a predefined value. For example, the first theoretical upper delay limit may be set based on a specific network environment. For example, the first theoretical upper delay limit may be set to 10 microseconds; or the first theoretical upper delay limit may be set to 100 microseconds.

The first transmission time is also a fixed value. For example, the first transmission time may be 2 microseconds; or the first transmission time may be 12 microseconds.

It should be further understood that the first delay is a value not less than the absolute value of the difference between the first theoretical upper time limit and the first transmission time, and because the first transmission time is a fixed value and the first theoretical upper delay limit is also a predefined fixed value, the first delay is also a fixed non-negative value.

It should be noted that, when the first network device is the $1^{st}$ network device that forwards the data packet (that is, a first-hop device), the first reference moment may be understood as any moment at which the data packet passes the first network device. For example, the first reference moment may be defined as a moment at which the data packet is output by a shaping module of the first network device. For example, the first reference moment may be defined as a moment at which the data packet is output by the first network device. For example, the first reference moment may be defined as a moment at which the data packet enters the first network device. In other words, when the first network device is the $1^{st}$ network device that forwards the data packet, the first reference moment is a predefined moment, and the predefined moment may be any moment at which the data packet passes the first network device.

The time information may be carried in a packet header of the data packet. For example, the packet header may be a media access control (MAC) header; or the packet header may be an IP header (for example, an IPv4 packet header or an IPv6 packet header).

It can be understood that moments described in the method 400 are all precise moment values by default, and the moments include the first moment, a second moment, the third moment, the first reference moment, the second reference moment, a third reference moment, the first output moment, the preset moment, and the like. Concepts such as a remaining processing time (for example, the first remaining processing time) and a theoretical upper time limit (for example, the first theoretical upper time limit) described in the method 400 mean differences between the precise moment values.

In actual application, time precision that can be identified and expressed by the second network device (for example, a router) is limited, and is usually 1 ns or 2 ns. The method for sending a data packet in this embodiment of this application may be based on this precision. Precision of a moment is the same as precision that can be identified and expressed by the second network device.

In an embodiment, an actual occurrence time of a moment (that is, any one of the moments described in the method 400) may be alternatively any time within a precision range. For example, if the precision that can be identified and expressed by the second network device is 1 ns, the precision of the moment is also 1 ns. Based on this, if a sending moment 1 is 1 µs 1 ns, an actual time of the sending moment 1 may be any time within 1 µs 1 ns to 1 µs 2 ns, for example, 1 µs 1.1 ns or 1 µs 1.99 ns. In an embodiment, the precision of the moment may be alternatively a preset precision range. For example, if preset precision is 10 µs, the precision of the moment is also 10 µs. The actual occurrence time of the moment may be any time within the precision range. Based on this, if a sending moment 1 is 13 µs, an actual time of the sending moment 1 may be any time within 13 µs to 23 µs, for example, 15 µs, 16 µs, or 18 µs.

In an embodiment, any one of the moments described in the method 400 may be alternatively represented by a predefined number. Specifically, a time may be divided into a plurality of moments based on a predefined granularity, and each moment is represented by one number. For example, 24 hours may be divided into 1440 moments by using 1 minute as a granularity, and each moment is represented by one Arabic numeral number. For example, a number 0 indicates 0 hours 0 minutes to 0 hours 1 minute, a number 1 indicates 0 hours 1 minute to 0 hours 2 minutes, and so on. If a sending moment 1 is 16, an actual time of the sending moment 1 may be any time within 0 hours 16 minutes to 0 hours 17 minutes, for example, 0 hours 16 minutes 08 seconds, 0 hours 16 minutes 31 seconds, or 0 hours 16 minutes 59 seconds.

The time precision is described below by using an example with reference to FIG. 5.

Figure 5:
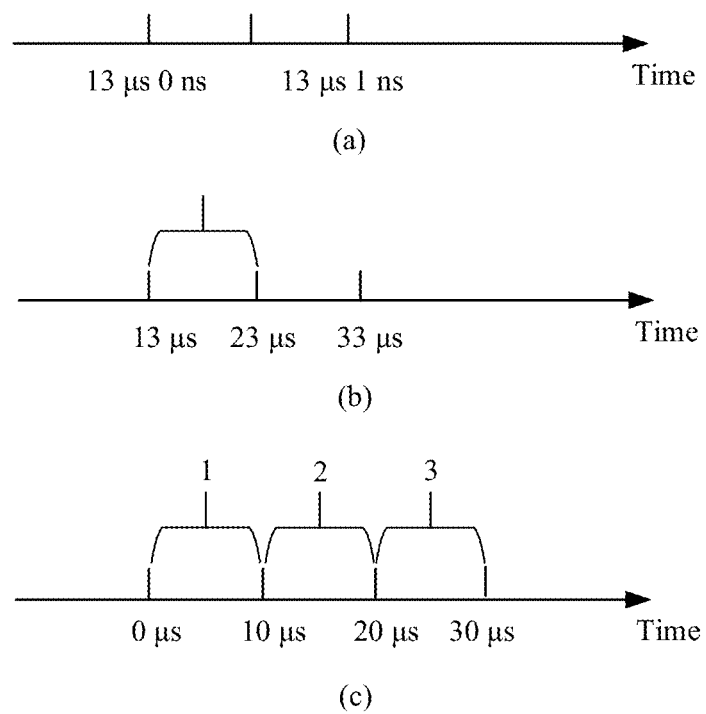
FIG. 5 is a schematic diagram of a moment according to an embodiment of this application.

For example, in (a) of FIG. 5, a time is expressed by using fine-grained precision. To be specific, a granularity of 1 ns is used as a basic granularity of a time. For example, the first moment may be 13 µs 0 ns or 13 µs 0.2 ns. For example, in (b) of FIG. 5, a time is expressed by using coarse-grained precision. For example, each moment value within a period of time from 13 µs to 23 µs may be considered as a same value (for example, 13 µs, 23 µs, or any moment within 13 µs to 23 µs). For example, in (c) of FIG. 5, a coarse granularity of 10 µs is used as a basic granularity of a time, and moments are sequentially numbered in ascending order. A number 0 is used to represent any moment within a period of time from 0 µs to 10 µs. A number 1 is used to represent any moment within a period of time from 10 µs to 20 µs (for example, 10 µs 2 ns). A number 3 is used to represent any moment within a period of time from 20 µs to 30 µs (for example, 25 µs).

Content included in the time information and an encapsulation format of the time information in the packet header are described below with reference to FIG. 6.

In an embodiment, the time information may include first indication information and second indication information. The first indication information is used to indicate the first processing time, and the second indication information is used to indicate the first delay. The first indication information includes a third time value and a fourth time value. The third time value is the first output moment at which the data packet is output by the first network device, and the fourth time value is the first reference moment. Refer to a format 1 in FIG. 6.

When the time information obtained by the second network device is in the format 1, the second network device may obtain the first processing time through calculation based on the fourth time value and the third time value in the format 1.

In an embodiment, the time information may include first indication information, and the first indication information is used to indicate the first processing time. The first indication information includes a third time value and a fourth time value. The third time value is the first output moment at which the data packet is output by the first network device, and the fourth time value is the first reference moment. Refer to a format 2 in FIG. 6.

Figure 6:
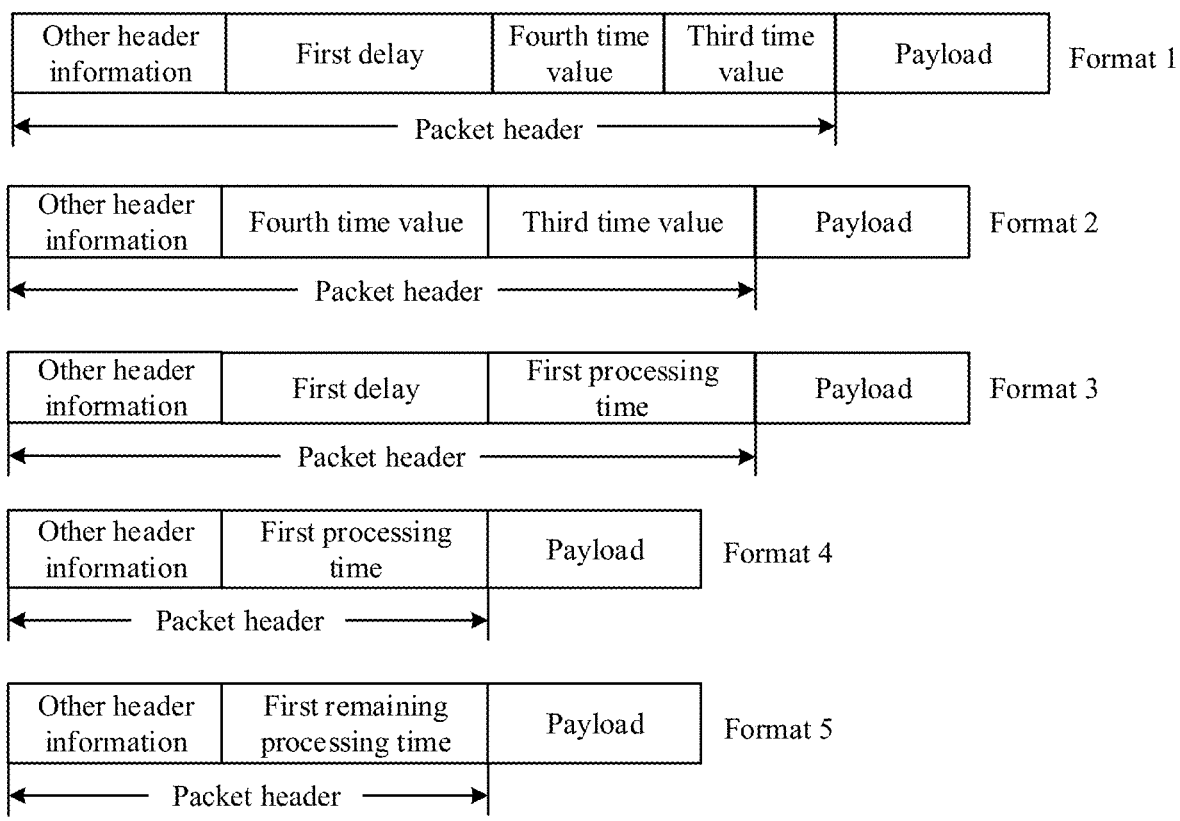
FIG. 6 shows an encapsulation format of time information in a header according to an embodiment of this application.

Compared with the format 1 in FIG. 6, a packet in the format 2 in FIG. 6 does not carry the first delay, and the second network device may obtain the first delay in another manner. For example, the second network device may obtain the first delay by delivering control plane signaling.

In an embodiment, the time information may include first indication information and second indication information. The first indication information is used to indicate the first processing time, and the second indication information is used to indicate the first delay. The first indication information includes a second time value, and the second time value is the first processing time. Refer to a format 3 in FIG. 6.

Compared with the format 1 and the format 2, a packet header corresponding to the format 3 may directly carry the first processing time.

In an embodiment, the time information may include first indication information, and the first indication information is used to indicate the first processing time. The first indication information includes a second time value, and the second time value is the first processing time. Refer to a format 4 in FIG. 6.

Compared with the format 3, a packet header in the format 4 does not carry the first delay, and the second network device may obtain the first delay in another manner. For example, the second network device may obtain the first delay by delivering control plane signaling.

In an embodiment, the time information may include a first time value, and the first time value is the first remaining processing time. Refer to a format 5 in FIG. 6.

Compared with the format 1 to the format 4, a packet header in the format 5 may directly carry the first remaining processing time.

In this embodiment of this application, the second network device may determine the second reference moment on an upstream board of the second network device. Alternatively, the second network device may determine the second reference moment on a downstream board of the second network device. It should be further understood that, when the second reference moment is determined on the upstream board of the second network device, the second network device may determine, based on the second reference moment, that the data packet is to enter a target queue on the upstream board; or when the second reference moment is determined on the downstream board of the second network device, the second network device may determine, based on the second reference moment, that the data packet is to enter a target queue on the downstream board.

First, a method for determining the second reference moment by the second network device on the upstream board is described.

In this embodiment of this application, that the second network device determines a second reference moment based on time information carried in the data packet includes: the second network device determines the second reference moment based on the first delay and the first processing time.

That the second network device determines the second reference moment based on the first delay and the first processing time includes: the second network device determines the second reference moment based on the first delay, the first reference moment, the first output moment at which the data packet is output by the first network device, and the first moment.

That the second network device determines the second reference moment based on the first delay, the first reference moment, the first output moment at which the data packet is output by the first network device, and the first moment includes: the second network device determines the second reference moment based on the following formula:

$$E^2 = t_{in}^2 + D_1^{max} - (t_{out}^1 - E^1),$$

where
$E^2$ is the second reference moment, $t_{in}^2$ is the first moment, $D_1^{max}$ is the first delay, $(t_{out}^1 - E^1)$ is the first processing time, $t_{out}^1$ is the first output moment at which the data packet is output by the first network device, $E^1$ is the first reference moment, and $D_1^{max}(t_{out}^1 - E^1)$ is the first remaining processing time.

It should be noted that, when the first network device is the $1^{st}$ network device that forwards the data packet (that is, a first-hop device), the first reference moment may be understood as any moment at which the data packet passes the first network device. For example, the first reference moment may be defined as a moment at which the data packet is output by a shaping module of the first network device. For example, the first reference moment may be defined as a moment at which the data packet is output by the first network device. For example, the first reference moment may be defined as a moment at which the data packet enters the first network device. In other words, when the first network device is the $1^{st}$ network device that forwards the data packet, the first reference moment is a predefined moment, and the predefined moment may be any moment at which the data packet passes the first network device.

The moments included in the process of determining the second reference moment by the second network device on the upstream board are specifically described below with reference to FIG. 7 and FIG. 8.

Figure 7:
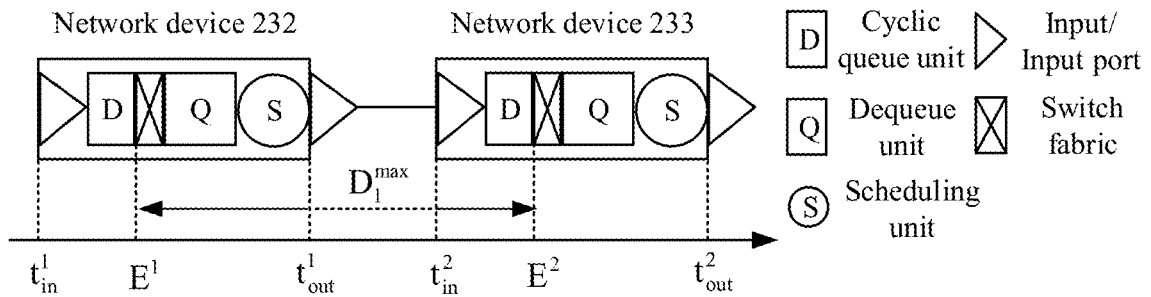
FIG. 7 is a sequence diagram of determining a second reference moment by a second network device on an upstream board according to an embodiment of this application.

FIG. 7 is a sequence diagram of determining a second reference moment by a second network device on an upstream board according to an embodiment of this application.

In FIG. 7, a network device 232 may be understood as the $2^{nd}$ network device that receives a data packet, and a network device 233 may be understood as the $3^{rd}$ network device that receives the data packet.

$t_{in}^1$ is a moment at which the network device 232 receives the data packet sent by a previous-hop network device. $E^1$ is a reference moment for instructing the data packet to enter a queue in a queue system of the network device 232, that is, a first reference moment.

$t_{out}^1$ is a first output moment at which the data packet is output by the network device 232.

$t_{in}^2$ is a moment at which the network device 233 receives the data packet sent by the network device 232, that is, a first moment. $E^2$ is a reference moment for instructing the data packet to enter a queue in a queue system of the network device 233, that is, a second reference moment.

$t_{out}^2$ is a second output moment at which the data packet is output by the network device 233.

$D_1^{max}$ is a time between a moment at which the data packet enters a switch fabric of the network device 232 and a moment at which the data packet enters a switch fabric of the network device 233 (excluding a time between a moment at which the data packet is output by the network device 232 and a moment at which the data packet enters the network device 233, that is, $$t_{in}^2 - t_{out}^1).$$

It should be understood that FIG. 7 is merely an example and does not constitute any limitation on this embodiment of this application. For example, in some embodiments, when the network device 232 in FIG. 7 is the network device 233 in FIG. 2, the network device 233 in FIG. 7 may be the network device 234 in FIG. 2. For example, in some embodiments, when the network device 232 in FIG. 7 is the network device 234 in FIG. 2, the network device 233 in FIG. 7 may be the egress edge device 235 in FIG. 2.

Figure 8:
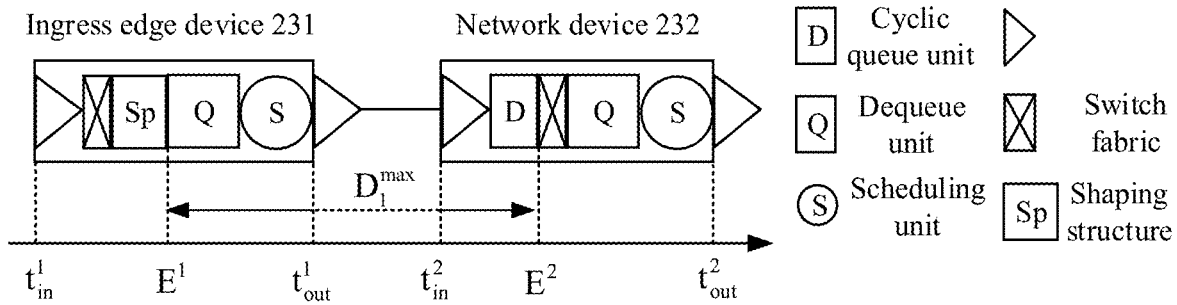
FIG. 8 is another sequence diagram of determining a second reference moment by a second network device on an upstream board according to an embodiment of this application.

FIG. 8 is another sequence diagram of determining a second reference moment by a second network device on an upstream board according to an embodiment of this application. It should be understood that moments shown in FIG. 8 are merely examples and do not constitute any limitation on this application.

In FIG. 8, an ingress edge device 231 may be understood as the $1^{st}$ network device that receives a data packet (that is, a first-hop device), and a network device 232 may be understood as the $2^{nd}$ network device that receives the data packet.

$$t_{in}^1$$

is a moment at which the ingress edge device 231 receives the data packet. $E^1$ is a moment at which the data packet is output by a shaping module of the ingress edge device 231, that is, an example of a first reference moment.

$$t_{out}^1$$

is a first output moment at which the data packet is output by the ingress edge device 231.

$$t_{in}^2$$

is a moment at which the network device 232 receives the data packet sent by the ingress edge device 231, that is, a first moment. $E^2$ is a reference moment for instructing the data packet to enter a queue in a queue system of the network device 232, that is, a second reference moment.

$$t_{out}^2$$

is a second output moment at which the data packet is output by the network device 232.

$$D_1^{max}$$

is a time between a moment at which the data packet is output by the shaping module of the ingress edge device 231 and a moment at which the data packet enters a switch fabric of the network device 232 (excluding a time between a moment at which the data packet is output by the ingress edge device 231 and a moment at which the data packet enters the network device 232, that is, $$t_{in}^2 - t_{out}^1).$$

It should be noted that, in FIG. 8, because the ingress edge device 231 is the $1^{st}$ network device that forwards the data packet (that is, a first-hop device), in this case, the first reference moment $E^1$ may be understood as any moment at which the data packet passes the ingress edge device 231. For example, the first reference moment may be defined as a moment at which the data packet is output by the shaping module of the ingress edge device 231. For example, the first reference moment may be defined as a moment at which the data packet is output by the ingress edge device 231. For example, the first reference moment may be defined as a moment at which the data packet enters the ingress edge device 231. In other words, in this case, the first reference moment is a predefined moment, and the predefined moment may be any moment at which the data packet passes the first network device.

A method for determining the second reference moment by the second network device on the downstream board is described below.

In this embodiment of this application, that the second network device determines a second reference moment based on time information carried in the data packet includes: the second network device determines the second reference moment based on the first delay and the first processing time.

That the second network device determines the second reference moment based on the first delay and the first processing time includes the following two methods.

Method 1:

That the second network device determines the second reference moment based on the first delay and the first processing time includes: the second network device determines the second reference moment based on the first delay, the first reference moment, the first output moment at which the data packet is output by the first network device the first moment.

In some embodiments, that the second network device determines the second reference moment based on the first delay, the first reference moment, the first output moment at which the data packet is output by the first network device, and the first moment includes: the second network device determines the second reference moment based on the following formula:

$$E^2 = t_{in}^2 + D_1^{max} - (t_{out}^1 - E^1),$$

where
$E^2$ is the second reference moment, $t_{in}^2$ is the first moment, $D_1^{max}$ is the first delay, $(t_{out}^1 - E^1)$ is the first processing time, $t_{out}^1$ is the first output moment at which the data packet is output by the first network device, $E^1$ is the first reference moment, and $D_1^{max} - (t_{out}^1 - E^1)$ is the first remaining processing time.

It should be noted that, when the first network device is the $1^{st}$ network device that forwards the data packet, the first reference moment may be understood as any moment at which the data packet passes the first network device. For example, the first reference moment may be defined as a moment at which the data packet is output by a shaping module of the first network device. For example, the first reference moment may be defined as a moment at which the data packet is output by the first network device. For example, the first reference moment may be defined as a moment at which the data packet enters the first network device. In other words, in this case, the first reference moment is a predefined moment, and the predefined moment may be any moment at which the data packet passes the first network device.

The method for determining the second reference moment in the method 1 is the same as the method for determining the second reference moment by the second network device on the upstream board.

Method 2:

That the second network device determines the second reference moment based on the first delay and the first processing time includes: the second network device determines the second reference moment based on the first delay, the first reference moment, the first output moment at which the data packet is output by the first network device, a moment at which a switch fabric of the second network device completes processing the data packet, and the first moment, where the moment at which the switch fabric of the second network device completes processing the data packet is earlier than the second reference moment.

In some embodiments, that the second network device determines the second reference moment based on the first delay, the first reference moment, the first output moment at which the data packet is output by the first network device, a moment at which a switch fabric of the second network device completes processing the data packet, and the first moment includes: the second network device determines the second reference moment based on the following formula:

$$E^2 = t_{in}^{'2} + [D_1^{max} - (t_{out}^1 - E^1)] - (t_{in}^{'2} - t_{in}^2),$$

where $E^2$ is the second reference moment, $t_{in}^{'2}$ is the moment at which the switch fabric of the second network device completes processing the data packet, $D_1^{max} - (t_{out}^1 - E^1)$ is the first remaining processing time, $(t_{out}^1 - E^1)$ is the first processing time, $D_1^{max}$ is the first delay, $t_{out}^1$ is the first output moment at which the data packet is output by the first network device, $E^1$ is the first reference moment, and $t_{in}^2$ is the first moment.

It should be noted that, when the first network device is the $1^{st}$ network device that forwards the data packet, the first reference moment may be understood as any moment at which the data packet passes the first network device. For example, the first reference moment may be a moment at which the data packet is output by a shaping module of the first network device. For example, the first reference moment may be a moment at which the data packet is output by the first network device. For example, the first reference moment may be a moment at which the data packet enters the first network device. In other words, in this case, the first reference moment is a predefined moment, and the predefined moment may be any moment at which the data packet passes the first network device.

The moments included in the process of determining the second reference moment by the second network device on the downstream board are specifically described below with reference to FIG. 9 and FIG. 10.

Figure 9:
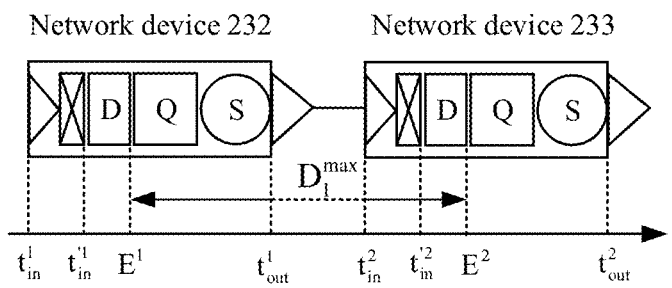
FIG. 9 is a sequence diagram of determining a second reference moment by a second network device on a downstream board according to an embodiment of this application.

FIG. 9 is a sequence diagram of determining a second reference moment by a second network device on a downstream board according to an embodiment of this application. For functions of units or structures included in FIG. 9, refer to FIG. 7. It should be noted that a cyclic queue unit and a dequeue unit shown in FIG. 9 are merely logical unit structures. In actual application, the cyclic queue unit and the dequeue unit may be included in one physical unit; or the cyclic queue unit and the dequeue unit may respectively correspond to two physical units.

In FIG. 9, a network device 232 may be understood as the $2^{nd}$ network device that receives a data packet, and a network device 233 may be understood as the $3^{rd}$ network device that receives the data packet.

$$t_{in}^1$$

is a moment at which the network device 232 receives the data packet sent by a previous-hop network device.

$$t_{in}'^1$$

is a moment at which the data packet is output by a switch fabric of the network device 232. $E^1$ is a reference moment for instructing the data packet to enter a queue in a queue system of the network device 232, that is, a first reference moment.

$$t_{out}^1$$

is a first output moment at which the data packet is output by the network device 232.

$$t_{in}^2$$

is a moment at which the network device 233 receives the data packet sent by the network device 232, that is, a first moment.

$$t_{in}'^2$$

is a moment at which the data packet is output by a switch fabric of the network device 233. $E^2$ is a reference moment for instructing the data packet to enter a queue in a queue system of the network device 233, that is, a second reference moment.

$$t_{out}^2$$

is a second output moment at which the data packet is output by the network device 233.

$$D_1^{max}$$

is a time between the first reference moment $E^1$ and the second reference moment $E^2$ (excluding a time between a moment at which the data packet is output by the network device 232 and a moment at which the data packet enters the network device 233, that is, $$t_{in}^2 - t_{out}^1).$$

It should be understood that FIG. 9 is merely an example and does not constitute any limitation on this embodiment of this application. For example, in some embodiments, when the network device 232 in FIG. 9 is the network device 233 in FIG. 2, the network device 233 in FIG. 9 may be the network device 234 in FIG. 2. For example, in some embodiments, when the network device 232 in FIG. 9 is the network device 234 in FIG. 2, the network device 233 in FIG. 9 may be the egress edge device 235 in FIG. 2.

Figure 10:
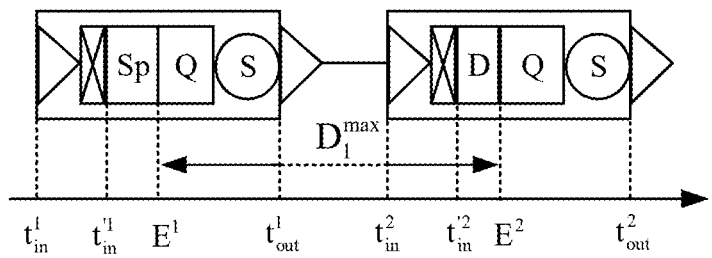
FIG. 10 is another sequence diagram of determining a second reference moment by a second network device on a downstream board according to an embodiment of this application.

FIG. 10 is another sequence diagram of determining a second reference moment by a second network device on a downstream board according to an embodiment of this application. For functions of units or structures included in FIG. 10, refer to FIG. 8. It should be understood that moments shown in FIG. 10 are merely examples and do not constitute any limitation on this application. It should be noted that a cyclic queue unit and a dequeue unit shown in FIG. 10 are merely logical unit structures. In actual application, the cyclic queue unit and the dequeue unit may be included in one physical unit; or the cyclic queue unit and the dequeue unit may respectively correspond to two physical units.

In FIG. 10, an ingress edge device 231 may be understood as the $1^{st}$ network device that receives a data packet, and an ingress edge device 231 may be understood as the $2^{nd}$ network device that receives the data packet.

$$t_{in}^1$$

is a moment at which the ingress edge device 231 receives the data packet sent by a previous-hop network device.

$$t_{in}'^1$$

is a moment at which the data packet enters a shaping module of the ingress edge device 231. $E^1$ is a moment at which the data packet is output by the shaping module of the ingress edge device 231, that is, an example of a first reference moment.

$$t_{out}^1$$

is a first output moment at which the data packet is output by the ingress edge device 231.

$$t_{in}^2$$

is a moment at which the network device 232 receives the data packet sent by the ingress edge device 231, that is, a first moment.

$t_{in}^{\prime 2}$ is a moment at which the data packet is output by a switch fabric of the network device 232. $E^2$ is a reference moment for instructing the data packet to enter a queue in a queue system of the network device 232, that is, a second reference moment.

$t_{out}^2$ is a second output moment at which the data packet is output by the network device 232.

$D_1^{max}$ is a time between the first reference moment $E^1$ and the second reference moment $E^2$ (excluding a time between a moment at which the data packet is output by the ingress edge device 231 and a moment at which the data packet enters the network device 232, that is, $(t_{in}^2 - t_{out}^1)$.

It should be noted that, in FIG. 10, because the ingress edge device 231 is the $1^{st}$ network device that forwards the data packet (that is, a first-hop device), in this case, the first reference moment $E^1$ may be understood as any moment at which the data packet passes the ingress edge device 231. For example, the first reference moment may be defined as a moment at which the data packet is output by the shaping module of the ingress edge device 231. For example, the first reference moment may be defined as a moment at which the data packet is output by the ingress edge device 231. For example, the first reference moment may be defined as a moment at which the data packet enters the ingress edge device 231. In other words, in this case, the first reference moment is a predefined moment, and the predefined moment may be any moment at which the data packet passes the ingress edge device 231.

Operation 430: The second network device determines, based on the second reference moment, a target queue from a plurality of queues included in the second queue system, and adds the data packet to the target queue.

It should be understood that, when the second reference moment is determined on the upstream board of the second network device, the second network device may determine, based on the second reference moment, that the data packet is to enter a target queue on the upstream board; or when the second reference moment is determined on the downstream board of the second network device, the second network device may determine, based on the second reference moment, that the data packet is to enter a target queue on the downstream board.

In some embodiments, the plurality of queues included in the second queue system are in a one-to-one correspondence with a plurality of preset moments, a difference between any two adjacent preset moments of the plurality of preset moments is a first value, and the preset moment may be understood as a moment at which a queue is enabled.

The first value may be a predefined value. For example, the first value may be set based on a specific application scenario or device capability. For example, the first value may be set to 10 microseconds; or the first value may be set to 15 microseconds.

Figure 11:
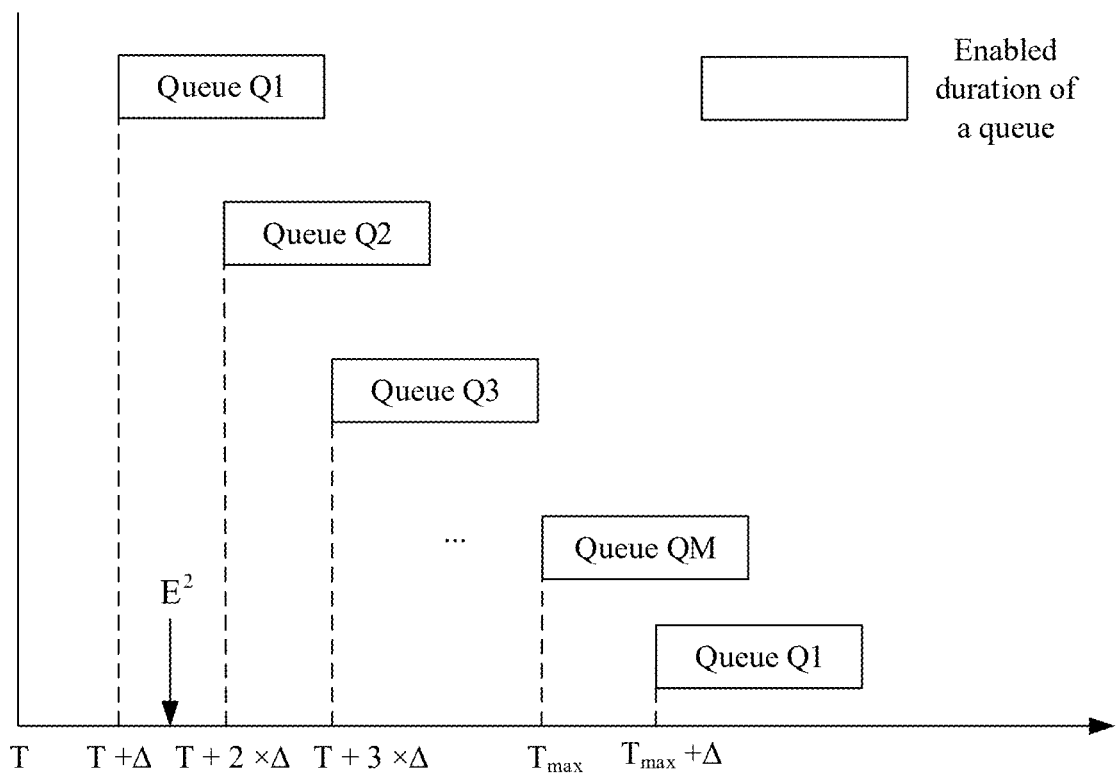
FIG. 11 is a schematic diagram of a second queue system according to an embodiment of this application.

FIG. 11 is a schematic diagram of a second queue system according to an embodiment of this application.

As shown in FIG. 11, the second queue system includes M queues: a queue Q1, a queue Q2, a queue Q3, . . . , and a queue QM, where M is a positive integer greater than 3. The M queues are in a one-to-one correspondence with M preset moments.

In some embodiments, a priority of the queue Q1 is higher than a priority of the queue Q2, the priority of the queue Q2 is higher than a priority of the queue Q3, and so on.

As shown in FIG. 11, a time interval between any two adjacent queues of the queue Q1 to the queue QM (for example, the Q1 and the queue Q2, or the queue Q2 and the queue Q3) is $\Delta$ (that is, the first value). Assuming that a start moment is T, a preset moment corresponding to the queue Q1 is T+$\Delta$, a preset moment corresponding to the queue Q2 is T+2×$\Delta$, a preset moment corresponding to the queue Q3 is T+3×$\Delta$, and so on, and a preset moment corresponding to the queue QM is $T_{max}$. As shown in FIG. 11, the M queues may be alternatively cyclic queues. After a system time exceeds the moment $T_{max}$, the M queues continue to circulate at the time interval $\Delta$. For example, a time interval between the preset moment corresponding to the queue Q1 and the preset moment corresponding to the queue QM is $\Delta$. In other words, the preset moment corresponding to the queue Q1 is $T_{max}+\Delta$. Similarly, a time interval between the preset moment corresponding to the queue Q2 and the preset moment corresponding to the queue Q1 is $\Delta$. In other words, the preset moment corresponding to the queue Q2 is $T_{max}+$2×$\Delta$, and so on. For a method for determining a cyclic queue, refer to operation 440 below.

According to the setting manner of the second queue system, that the second network device determines, based on the second reference moment, a target queue from a plurality of queues included in the second queue system includes:

the second network device determines, based on the second reference moment, that one queue corresponding to a first target moment among the plurality of queues included in the second queue system is the target queue, where the first target moment is a sum of the second reference moment and a second value, the second value is an absolute value of a difference between the second reference moment and a third moment plus an integer multiple of the first value, any one of the plurality of preset moments is not included between the second reference moment and the third moment, the third moment is one moment of the plurality of preset moments, the third moment is later than the second reference moment, and the first target moment is one moment of the plurality of preset moments.

For example, as shown in FIG. 11, the first value is $\Delta$, and the second reference moment is $E^2$=T+1.5×$\Delta$. In this case, the third moment is T+2×$\Delta$.

The second value is the absolute value of the difference between the second reference moment and the third moment plus the integer multiple of the first value. Specifically, the second value is the absolute value of the difference between the second reference moment and the third moment plus n times of the first value, where n may be a negative integer (for example, n=−1), or n may be a positive integer (for example, n=1 or 2), or n may be 0. It should be understood that, because a value of the first value is quite small, the absolute value of the difference between the second reference moment and the third moment is approximately equal to the absolute value of the difference between the second reference moment and the third moment plus n times of the first value. It should be further understood that the third moment and the first target moment are a same moment when n is 0.

As shown in FIG. 11, the first value is $\Delta$, and the second reference moment is $E^2=T+1.5\times\Delta$. When n=−1 and the third moment is $T+2\times\Delta$, the second value is $|E^2-(T+2\times\Delta)|+(-1\times\Delta)=-0.5\times\Delta$. Therefore, the first target moment is $E^2-0.5\times\Delta=T+\Delta$. In this case, the target queue is the queue Q1. When n=1 and the third moment is $T+2\times\Delta$, the second value is $|E^2-(T+2\times\Delta)|+(1\times\Delta)=1.5\times\Delta$. Therefore, the first target moment is $E^2+1.5\times4=T+3\Delta$. In this case, the target queue is the queue Q3. When n=0 and the third moment is $T+2\times\Delta$, the second value is $|E^2-(T+2\times\Delta)|+(0\times\Delta)=0.5\times\Delta$. Therefore, the first target moment is $E^2+0.5\times\Delta=T+2\Delta$. In this case, the target queue is the queue Q2.

It should be noted that, in actual application, n times of the first value is a same value for each data packet included in a same stream received by the second network device. That is, in this case, n is a fixed value. For example, in a scenario A, the second network device receives a service stream A at a specific moment. In this case, in a process of determining a first target moment corresponding to each data packet included in the service stream A, n=−1 is set.

It should be understood that FIG. 11 is merely an example and does not constitute any limitation on the method for determining the target queue based on the second reference moment in this application.

It should be further understood that a moment at which the data packet is added to the target queue serves as a start moment, and after a fixed period of time (that is, an interval between enabling moments of any two adjacently enabled queues of a plurality of queues included in the second network device, that is, the first value), a remaining processing time for the data packet to pass a previous hop of the second network device (that is, the first remaining processing time for the data packet to pass the first network device) is consumed on the second network device.

In some other embodiments, the second queue system may include N level 1 queues and M level 2 queues, where N and M are positive integers greater than or equal to 1. The N level 1 queues correspond to N first preset moments, and the M level 2 queues correspond to M second preset moments. A difference between any two adjacent first preset moments is the first value, a difference between any two adjacent second preset moments is the second value, and the first value is less than the second value. A priority of any level 1 queue is higher than a priority of any level 2 queue.

According to the setting manner of the second queue system, that the second network device determines a target queue based on the second reference moment includes:
  the second network device determines, based on the second reference moment, the N first preset moments, and the M second preset moments, that the data packet enters one of the plurality of queues included in the second queue system.

It should be understood that, when the second network device determines that the data packet may enter either one of the N level 1 queues or one of the M level 2 queues at a specific moment, the second network device determines that the data packet is to enter one of the M level 2 queues.

It should be further understood that, according to the setting manner of the second queue system, the second network device sends the data packet to a third network device in one of the N level 1 queues. In other words, if the second network device determines to add the data packet to one of the M level 2 queues, after the data packet is added to one of the M level 2 queues, the second network device further removes the data packet from the one of the M level 2 queues in which the data packet is located, and adds the data packet to one of the N level 1 queues.

According to the setting manner of the second queue system, that the second network device determines a data packet dequeue method includes:
  the second network device determines a method for sending the data packet from one of the N level 1 queues to the third network device, where specifically, the second network device may send the data packet to the third network device according to a scheduling rule corresponding to the N level 1 queues, the scheduling rule corresponding to the N level 1 queues may be a predefined scheduling rule, or the scheduling rule corresponding to the N level 1 queues may be a scheduling rule related to a queue priority, and this is not limited in this application; and
  the second network device determines a method for removing the data packet from one of the M level 2 queues and adding the data packet to one of the N level 1 queues, where specifically, after a level 2 queue that the data packet joins is enabled, the second network device may remove, based on the second reference moment, the data packet from the level 2 queue that the data packet joins, and add the data packet to one of the N level 1 queues.

It should be understood that the N level 1 queues are one cyclic queue, and the M level 2 queues are another cyclic queue. In other words, a circulation manner of the N level 1 queues and a circulation manner of the M level 2 queues do not affect each other.

Operation 440: The second network device sends the data packet to the third network device according to a scheduling rule corresponding to the second queue system.

When the time information includes the first processing time (refer to the format 4 in FIG. 6), before operation 440, the method further includes:
  the second network device updates the first processing time carried in the packet header of the data packet, where specifically, the first processing time carried in the packet header of the data packet is updated to a difference between the first output moment at which the data packet is output by the second network device and the second reference moment.

When the time information includes the first output moment at which the data packet is output by the first network device (refer to the third time value in FIG. 6) and the first reference moment (refer to the fourth time value in FIG. 6), before operation 440, the method further includes:
  the second network device updates the first output moment at which the data packet is output by the first network device and that is carried in the packet header of the data packet to a second output moment at which the data packet that is output by the second network device, and updates the first reference moment carried in the packet header of the data packet to the second reference moment.

In this embodiment of this application, that the second network device sends the data packet to the third network device according to a scheduling rule corresponding to the second queue system includes:

the second network device determines that the target queue is a queue scheduled at a current moment among the plurality of queues included in the second queue system and that the target queue is in an enabled state, and the second network device sends the data packet to the third network device.

In an embodiment, after the second network device sends the data packet to the third network device according to the scheduling rule corresponding to the second queue system, the method further includes:

when the target queue meets a first preset condition, the second network device determines to disable the target queue.

The first preset condition includes: the target queue is an empty queue, enabled duration of the target queue is greater than or equal to the first value, the first value is the difference between any two adjacent preset moments of the plurality of preset moments, and the plurality of preset moments are in a one-to-one correspondence with the plurality of queues included in the second queue system.

The first value is a predefined value. The first value may be set based on a specific application scenario or device capability. For example, the first value may be set to 10 microseconds; or the first value may be set to 15 microseconds.

In some embodiments, that the second network device determines that the target queue is a queue scheduled at a current moment among the plurality of queues included in the second queue system includes:

when the second network device determines that the target queue is a queue with a highest priority among the plurality of queues included in the second queue system, the second network device determines that the target queue is the queue scheduled at the current moment among the plurality of queues included in the second queue system; and after the second network device determines to disable the target queue, the method further includes:

the second network device sets a priority of the target queue to a queue with a lowest priority among the plurality of queues included in the second queue system, and increases a priority of a queue other than the target queue among the plurality of queues included in the second queue system.

In the foregoing solution, the network device schedules, based on strict priorities, the queues included in the second queue system. In other words, the network device schedules, in an order of priorities, the queues included in the second queue system. If scheduling of a data packet in a queue with a higher priority is not completed, the network device does not start to schedule a data packet in a queue with a next priority. It should be further understood that, when a queue with a highest priority is empty but the queue with the highest priority is not disabled, the network device may start to schedule a data packet in a queue with a second highest priority.

For example, the second queue system includes three queues: a queue 1 (with a priority of 1), a queue 2 (with a priority of 2), and a queue 3 (with a priority of 3), where the priority 1 is higher than the priority 2, and the priority 2 is higher than the priority 3. Because the queue 1 has a highest priority, the second network device may determine that the queue 1 is the target queue. When the second network device has completed scheduling of all data packets in the queue 1 and enabled duration of the queue 1 meets a preset condition, the second network device disables the queue 1, and the second network device sets the priority of the queue 2 to 1, sets the priority of the queue 3 to 2, and sets the priority of the queue 1 to 3. In the foregoing data packet scheduling process, when the second network device has completed the scheduling of all the data packets in the queue 1 and the queue 1 is not disabled, the second network device may start to schedule a data packet in the queue 2.

In some other embodiments, the plurality of queues included in the second queue system are in a one-to-one correspondence with a plurality of preset scheduling orders, and that the second network device determines that the target queue is a queue scheduled at a current moment among the plurality of queues included in the second queue system includes:

when the second network device determines, according to the plurality of preset scheduling orders, that a preset scheduling order corresponding to the target queue is a scheduling order corresponding to the queue scheduled by the second network device at the current moment, the second network device determines that the target queue is the queue scheduled at the current moment among the plurality of queues included in the second queue system.

In the foregoing solution, the network device may schedule, in a predefined scheduling order, the queues included in the second queue system. In a specific queue scheduling process, the network device does not need to compare priorities of the queues.

In an embodiment, after the second network device determines to disable the target queue, the method further includes:

the second network device determines a second target moment based on first information, where the second target moment corresponds to the target queue, the second target moment is an enabling moment that corresponds to the target queue and that is later than the first target moment, the second target moment is later than any one of the plurality of preset moments, and the first information includes a scheduling order corresponding to each queue included in the second queue system and an enabling moment corresponding to each queue included in the second queue system; and the plurality of queues included in the second queue system are in a one-to-one correspondence with the plurality of preset moments, the difference between any two adjacent preset moments of the plurality of preset moments is the first value, the one queue corresponding to the first target moment among the plurality of queues included in the second queue system is the target queue, the first target moment is the sum of the second reference moment and the second value, the second value is the absolute value of the difference between the second reference moment and the third moment plus the integer multiple of the first value, any one of the plurality of preset moments is not included between the second reference moment and the third moment, the third moment is one moment of the plurality of preset moments, the third moment is later than the second reference moment, and the first target moment is one moment of the plurality of preset moments. Specifically, for a method for determining the second value and the third moment, refer to operation 430. Details are not described herein again.

An enabling moment corresponding to each queue included in the second queue system may be predefined. A scheduling order corresponding to each queue included in the second queue system may be predefined.

In the foregoing solution, the second network device may cyclically use each queue included in the second queue system, to improve resource utilization.

Figure 12:
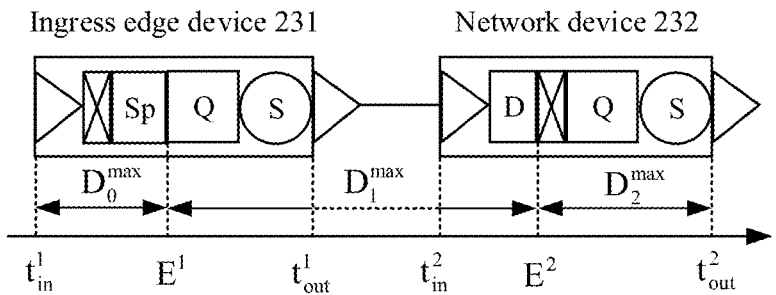
FIG. 12 is a schematic diagram of a deterministic delay of a data packet after the data packet is forwarded by a network device according to an embodiment of this application.

A delay generated after the data packet is forwarded by the first network device and the second network device is described below with reference to FIG. 12. It should be understood that FIG. 12 is merely an example and does not constitute any limitation on this application. For example, the delay generated after the data packet is forwarded by the first network device and the second network device may be alternatively analyzed by using the network devices included in FIG. 7.

It should be further understood that, because an ingress edge device 231 in FIG. 12 is the $1^{st}$ network device that forwards a data packet (that is, a first-hop device), in this case, a first reference moment $E^1$ may be understood as any moment at which the data packet passes the ingress edge device 231. For example, the first reference moment may be defined as a moment at which the data packet is output by a shaping module of the ingress edge device 231. For example, the first reference moment may be defined as a moment at which the data packet is output by the ingress edge device 231. For example, the first reference moment may be defined as a moment at which the data packet enters the ingress edge device 231. In other words, in this case, the first reference moment is a predefined moment, and the predefined moment may be any moment at which the data packet passes the ingress edge device 231. For ease of description, in FIG. 12, that the first reference moment $E^1$ is the moment at which the data packet is output by the ingress edge device 231 is merely used as an example for description.

As shown in FIG. 12, $$D_0^{max}$$

is a maximum delay between a moment at which the data packet is received by the ingress edge device 231 (that is, an example of the first network device) to a moment at which the data packet is added by the ingress edge device 231 to a queue of the ingress edge device 231, $$D_1^{max}$$

is a maximum delay (excluding $$t_{in}^2 - t_{out}^1$$

) between the moment at which the data packet is output by the shaping module of the ingress edge device 231 and a moment at which the data packet is added to a queue of a network device 232 (that is, an example of the second network device), and $$D_2^{max}$$

is a maximum delay between the moment at which the data packet is added by the network device 232 to the queue of the network device 232 and a moment at which the data packet is output by the network device 232. Meanings of other parameters in FIG. 12 are the same as meanings of the parameters in FIG. 8. Details are not described herein again.

$$D_0^{max}, D_1^{max}, \text{ and } D_2^{max}$$

are all predefined values, and for example, may be set based on a specific application scenario or device capability. For example, when a network environment is good, $$D_0^{max}, D_1^{max}, \text{ and } D_2^{max}$$

may be all set to 10 microseconds (or 5 microseconds); or when a network environment is good, $$D_0^{max}$$

may be set to 5 microseconds, $$D_1^{max}$$

may be set to 10 microseconds, and $$D_2^{max}$$

may be set to 5 microseconds. For example, when a network environment is poor, $$D_0^{max}, D_1^{max}, \text{ and } D_2^{max}$$

may be all set to 10 microseconds (or 50 microseconds); or when a network environment is poor, $$D_0^{max}$$

may be set to 50 microseconds, $$D_1^{max}$$

may be set to 100 microseconds, and $$D_2^{max}$$

may be set to 50 microseconds.

According to the method for sending a data packet in this application, when a remaining processing time of the data packet after the data packet is forwarded by the ingress edge device 231 is greater than 0, after the data packet enters the network device 232, the network device 232 determines, based on the remaining processing time and a moment at which the network device 232 receives the data packet, that the data packet is to be added to a queue of the network device 232. A moment at which the data packet enters a queue of the network device 232 serves as a start moment, and after a period of time, the remaining processing time ends at a second reference moment corresponding to the data packet. The remaining processing time is consumed on the network device 232. Therefore, a deterministic delay of the data packet after the data packet is forwarded by the ingress edge device 231 and the network device 232 is $$D_0^{max} + D_1^{max} + D_2^{max}.$$

After the network device 232 performs the method for sending a data packet in this application on each data packet included in a received stream, it can be ensured that a shape of a stream, in which the data packet is located, that enters the network device 232 is the same as a shape of a stream, in which the data packet is located, that is output by the network device 232.

In the method for sending a data packet in this embodiment of this application, the second network device may determine a remaining processing time of a data packet on the first network device based on a preconfigured maximum delay within which the data packet is allowed to stay on the first network device. When the remaining processing time is greater than 0, a moment at which the data packet enters a queue on the second network device (that is, an example of the target queue) serves as a start moment, and after a period of time, the remaining processing time ends at a second reference moment corresponding to the data packet. The remaining processing time is consumed on the second network device. Therefore, a deterministic delay and jitter of the data packet after the data packet is forwarded by the first network device and the second network device can be ensured, so that a shape of a stream, in which the data packet is located, that enters a network device is the same as a shape of a stream, in which the data packet is located, that is output by the network device.

Compared with a conventional technology, in the method for sending a data packet in this embodiment of this application, time synchronization is not required between network devices that forward the data packet, and a length of a link for forwarding the data packet is not specifically limited. The method is applicable to a large-scale network, to provide an upper limit of an end-to-end deterministic delay and an upper limit of an end-to-end deterministic jitter.

A specific embodiment of the method for sending a data packet in this embodiment of this application is described below with reference to FIG. 13 and FIG. 14.

Figure 13:
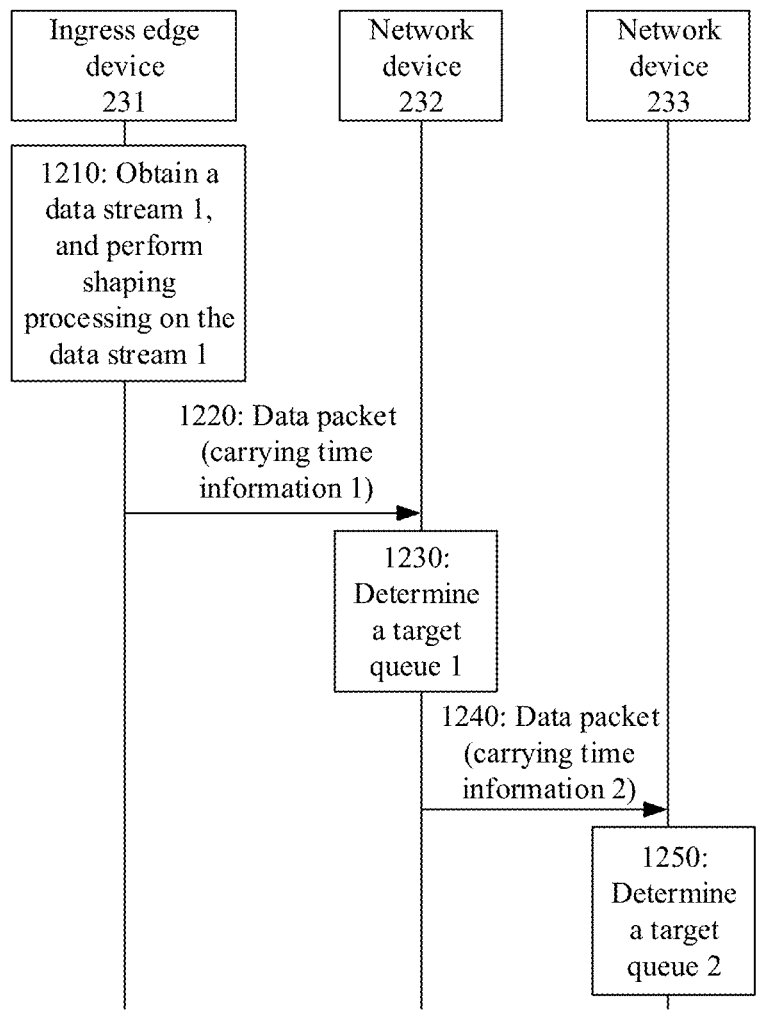
FIG. 13 shows a specific embodiment of a method for sending a data packet according to an embodiment of this application.

FIG. 13 shows a specific embodiment of a method for sending a data packet according to an embodiment of this application. The method includes operation 1210 to operation 1250. The operations are described in detail below. It should be understood that FIG. 13 is merely an example and does not constitute any limitation on this application. It should be further understood that moments shown in FIG. 14 are merely examples and do not constitute any limitation on this application. For example, $E^1$ in FIG. 14 may be a moment at which a data packet is output by an ingress edge device 231; or $E^1$ in FIG. 14 may be alternatively a moment at which a data packet enters an ingress edge device 231.

Operation 1210: The ingress edge device 231 obtains a data stream 1, and performs shaping processing on the data stream 1.

The ingress edge device 231 may perform shaping processing on the data stream 1 by using a leaky bucket algorithm, so that a shaped data stream 1 meets the following formula:

$A_1(t) = r_1 \times t + B_1$, where t is a time, $A_1(t)$ is total data traffic of the data stream 1 within the time t, $r_1$ is bandwidth required for the data stream 1, $B_1$ is a maximum burst degree of the data stream 1, and $r_1$ is average bandwidth, where the average bandwidth may be understood as an average speed of the data stream 1 in a statistical sense.

Operation 1220: The ingress edge device 231 sends a data packet carrying time information 1 to a network device 232.

Before operation 1220, the method further includes: the ingress edge device 231 determines the time information 1.

The time information 1 is used to indicate a remaining processing time of the data packet on the ingress edge device 231. The time information 1 may include a moment at which the data packet is output by a shaping module of the ingress edge device 231 and an output moment at which the data packet is output by the ingress edge device 231, and the time information 1 is encapsulated in a packet header of the data packet. For ease of description, a reference moment 1 may be used below to represent the moment at which the data packet is output by the shaping module of the ingress edge device 231. Because the ingress edge device 231 is the 1$^{st}$ network device that receives the data packet (that is, a first-hop device), the reference moment 1 is a predefined moment.

Figure 14:
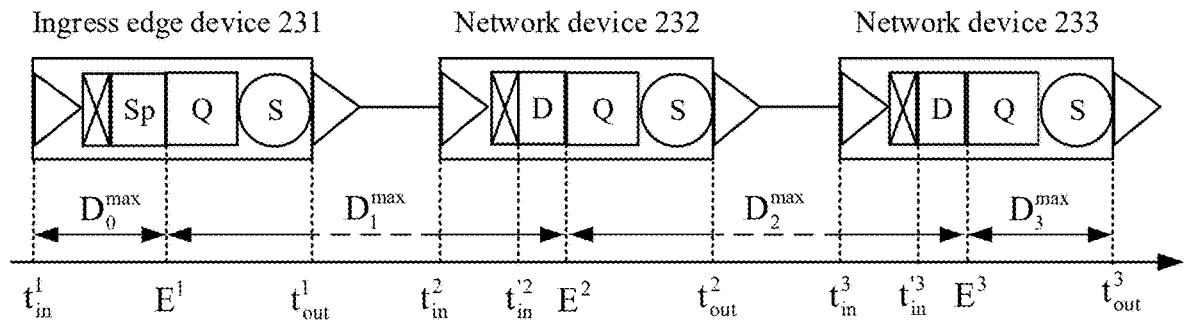
FIG. 14 is a schematic diagram of a deterministic delay of a data packet after the data packet is forwarded by a network device according to an embodiment of this application.

Specifically, as shown in FIG. 14, the time information 1 includes $E^1$ and $$t_{out}^1,$$

where $E^1$ is the moment at which the data packet is output by the shaping module of the ingress edge device 231, and $$t_{out}^1$$

is the output moment at which the data packet is output by the ingress edge device 231.

Operation 1230: The network device 232 determines a target queue 1 based on the time information 1 carried in the received data packet.

That the network device 232 determines a target queue 1 based on the time information 1 carried in the received data packet includes:

the network device 232 determines a reference moment 2 based on the time information 1 carried in the data packet, and the network device 232 determines the target queue 1 based on the reference moment 2, where the reference moment 2 is a reference moment for instructing the data packet to enter a queue in a queue system of the network device 232.

Before the reference moment 2 is determined, the method further includes: the network device 232 obtains a delay 1 on a control plane, where the delay 1 is a time between the moment at which the data packet is output from the shaping module of the ingress edge device 231 and the reference moment 2 (excluding a time between the moment at which the data packet is output by the ingress edge device 231 and a moment at which the data packet is received by the network device 232). In other words, the delay 1 may also be understood as follows: The moment at which the data packet is output by the shaping module of the ingress edge device 231 serves as a start moment, and after the delay 1 (excluding the time between the moment at which the data packet is output by the ingress edge device 231 and the moment at which the data packet is received by the network device 232) elapses, the data packet is definitely added to one of a plurality of queues included in the queue system of the network device 232. The delay 1 is a predefined value.

In some embodiments, the network device 232 may determine the reference moment 2 based on the following formula:

$$E^2 = t_{in}^2 + [D_1^{max} - (t_{out}^1 - E^1)] - (t_{in}'^2 - t_{in}^2),$$

where
$E^2$ is the reference moment 2, $t_{in}'^2$ is a moment at which the data packet is processed by a switch fabric of the network device 232, $D_1^{max} - (t_{out}^1 - E^1)$ is a remaining processing time for the data packet to pass the ingress edge device 231, $(t_{out}^1 - E^1)$ is a processing delay of the data packet on the network device 232, $D_1^{max}$ is the delay 1, $t_{out}^1$ is the moment at which the data packet is output by the ingress edge device 231, $E^1$ is the reference moment 1, and $t_{in}^2$ is the moment at which the data packet enters the network device 232.

The network device 232 may determine the target queue 1 on a downstream board of the network device 232 based on the reference moment 1. A specific method for determining the target queue 1 is the same as the method for determining the target queue in operation 430. Details are not described herein again.

It should be understood that, in the foregoing solution, a moment at which the data packet that is sent by the ingress edge device 231 and that is received by the network device 232 enters a queue on the network device 232 (that is, the target queue 1) serves as a start moment, and after a period of time, the remaining processing time for the data packet to pass the ingress edge device 231 ends at the reference moment 2. The remaining processing time for the data packet to pass the ingress edge device 231 is consumed on the network device 232.

Operation 1240: The network device 232 sends a data packet carrying time information 2 to a network device 233.

Before operation 1240, the method further includes: the network device 232 determines the time information 2, and updates the time information 1 carried in the packet header of the data packet to the time information 2. The time information 2 may include the reference moment 2 and a moment at which the data packet is output by the network device 232.

After the time information carried in the packet header of the data packet is updated, time information carried in the data packet is the time information 2.

When the network device 232 determines that a priority of the target queue 1 (a priority of a queue in which the data packet is located) is a queue with a highest priority among the plurality of queues included in the network device 232 and that the target queue 1 is in an enabled state, the network device 232 may send the data packet carrying the time information 2 to the network device 232.

Operation 1250: The network device 233 determines a target queue 2 based on the time information 2 carried in the received data packet.

That the network device 233 determines a target queue 2 based on the time information 2 carried in the received data packet includes:
the network device 233 determines a reference moment 3 based on the time information 2 carried in the data packet, and the network device 232 determines the target queue 2 based on the reference moment 3, where the reference moment 3 is a reference moment for instructing the data packet to enter a queue in a queue system of the network device 233.

Before the reference moment 3 is determined, the method further includes: the network device 233 obtains a delay 2 on a control plane, where the delay 2 is a time between the reference moment 2 and the reference moment 3 (excluding a time between the moment at which the data packet is output by the network device 232 and a moment at which the data packet is received by the network device 233). In other words, the delay 2 may also be understood as follows: A moment at which the data packet enters the switch fabric of the network device 232 serves as a start moment, and after the delay 2 (excluding the time between the moment at which the data packet is output by the network device 232 and the moment at which the data packet is received by the network device 233) elapses, the data packet is definitely added to one of a plurality of queues included in the queue system of the network device 233. The delay 2 is a predefined value.

In some embodiments, the network device 233 may determine the reference moment 3 based on the following formula:

$$E^3 = t_{in}^3 + [D_2^{max} - (t_{out}^2 - E^2)] - (t_{in}'^3 - t_{in}^3),$$

where
$E^3$ is the reference moment 3, $$t_{in}^{\prime 3}$$

is a moment at which the data packet is processed by a switch fabric of the network device 233, $$D_2^{max} - (t_{out}^2 - E^2)$$

is a remaining processing time for the data packet to pass the network device 232, $$(t_{out}^2 - E^2)$$

is a processing delay of the data packet on the network device 232, $$D_2^{max}$$

is the delay 2, $$t_{out}^2$$

is the moment at which the data packet is output by the network device 232, $E^2$ is the reference moment 2, and $$t_{in}^3$$

is the moment at which the data packet enters the network device 233.

The network device 233 may determine, on a downstream board of the network device 233 based on the reference moment 2, that one of the plurality of queues of the network device 233 is the target queue 2. A specific method for determining the target queue 2 is the same as the method for determining the target queue in operation 430. Details are not described herein again.

It should be understood that, in the foregoing solution, a moment at which the data packet that is sent by the network device 232 and that is received by the network device 233 enters a queue on the network device 233 (that is, the target queue 2) serves as a start moment, and after a period of time, the remaining processing time for the data packet to pass the network device 232 ends at the reference moment 3. The remaining processing time for the data packet to pass the network device 232 is consumed on the network device 233.

According to the foregoing method, after the data packet undergoes forwarding processing by the ingress edge device 231 to the network device 233, it can be determined that a fixed delay for forwarding the data packet is a sum of the delay 1, the delay 2, the delay 3, and a delay 4. The delay 3 is a time between a moment at which the data packet is received by the ingress edge device 231 and the reference moment 1 (that is, $$D_0^{max}$$

in FIG. 14). The delay 4 is a time between the reference moment 3 and a moment at which the data packet is output by the network device 233 (that is, $$D_3^{max}$$

in FIG. 14). The delay 1, the delay 2, the delay 3, and the delay 4 are predefined values. For example, the delay 1, the delay 2, the delay 3, and the delay 4 may be all set to 12 microseconds. In the method for sending a data packet in this embodiment of this application, it can be ensured that an upper bound of an end-to-end delay of any stream does not exceed the sum of the delay 1, the delay 2, the delay 3, and the delay 4.

According to the method for sending a data packet in this embodiment of this application, a deterministic delay and jitter of the data packet after the data packet is forwarded by the ingress edge device 231, the network device 232, and the network device 233 can be ensured, so that a shape of a stream, in which the data packet is located, that enters a network device is the same as a shape of a stream, in which the data packet is located, that is output by the network device.

Compared with a conventional technology, in the method for sending a data packet in this embodiment of this application, time synchronization is not required between network devices that forward the data packet, and a length of a link for forwarding the data packet is not specifically limited either. The method is applicable to a large-scale network, to provide an upper limit of an end-to-end deterministic delay and an upper limit of an end-to-end deterministic jitter.

It should be noted that, in FIG. 13, the method for sending a data packet in this application is described only by using an example in which a data packet is forwarded by three network devices and each network device determines a reference moment on a downstream board and determines, based on the reference moment, that the data packet is to enter a target queue on the downstream board. However, this does not constitute any limitation on this application. For example, the data packet may be alternatively forwarded by more network devices (for example, five network devices or 10 network devices) or fewer network devices (for example, two network devices).

The method for sending a data packet in embodiments of this application is described above in detail with reference to FIG. 2 to FIG. 14. Functional modules of a second network device provided in embodiment of this application are specifically described below with reference to FIG. 15.

Figure 15:
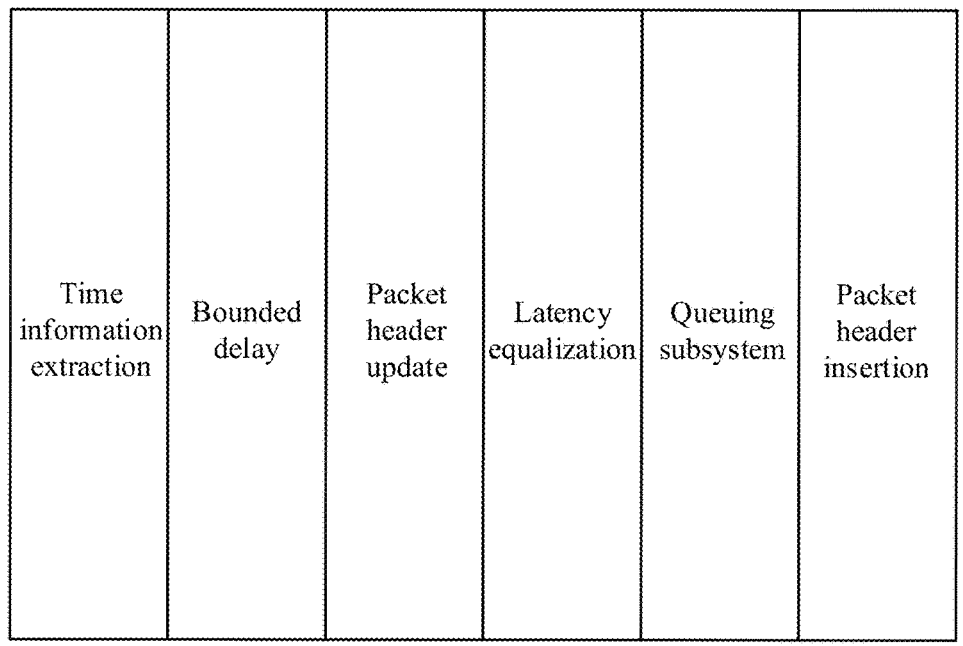
FIG. 15 shows functional modules of a second network device according to an embodiment of this application.

FIG. 15 shows functional modules of a second network device according to an embodiment of this application.

As shown in FIG. 15, the second network device may include six functional modules, and according to a chronological order in which the functional modules process a data packet, the six functional modules are sequentially as follows: a time information capture (packet arrival time capture) module, a bounded delay module (bounded variable delay units), a packet header update module (damper header update unit), a latency equalizer, a queuing subsystem, and a packet header insertion module (damper header insertion unit).

Functions of the foregoing functional modules are specifically described below.

The time information capture (packet arrival time capture) module is configured to obtain the time information and the reference moment (for example, the first reference moment or the second reference moment) in the method 400.

The bounded delay module (bounded variable delay units) is configured to perform parsing, table lookup, switching network forwarding, and the like on the data packet. Any one of the foregoing processing on the data packet has a predictable maximum upper bound of a delay.

It should be noted that the time information capture module and the bounded delay module are jointly configured to obtain the time information and the reference moment in the method 400.

The packet header update module (damper header update unit) is configured to update time information carried in the data packet (that is, the time information in the method 400).

The latency equalizer is configured to: after the data packet enters the network device, wait for a specific period of time and then add the data packet to a queue of the network device. Specifically, the network device implements active waiting of the data packet in a scheduling manner of cyclic gating. After the data packet passes the latency equalizer, shaping of the data packet may be completed.

The queuing subsystem is configured to perform queuing management on a plurality of queues included in the network device.

The packet header insertion module (damper header insertion unit) is configured to: before the data packet is output by the network device to a next-hop network device of the network device, insert time information related to the network device (that is, the time information in the method 400) into a packet header of the data packet.

Figure 16:
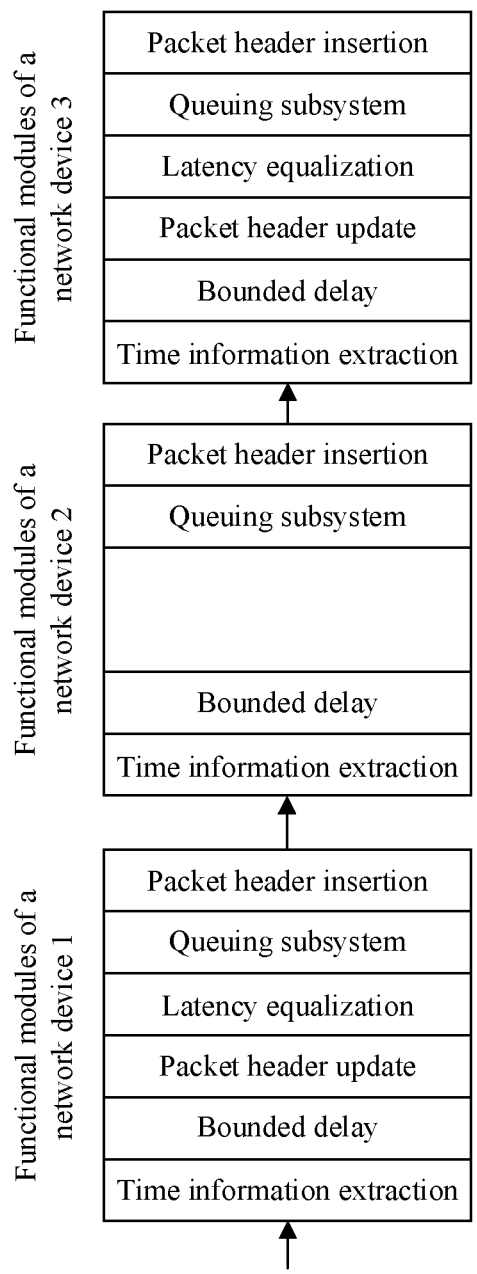
FIG. 16 shows functional modules of a network device for sending a data packet according to an embodiment of this application.

FIG. 16 shows functional modules of a network device for sending a data packet according to an embodiment of this application.

As shown in FIG. 16, three network devices are included: a network device 1, a network device 2, and a network device 3. The network device 1 and the network device 3 each include all the functional modules included in the second network device in FIG. 15. The network device 2 includes only four functional modules included in the second network device in FIG. 15. According to an order in which the modules process a data packet, the four functional modules are sequentially as follows: a time information capture (packet arrival time capture) module, a bounded delay module (bounded variable delay units), a queuing subsystem, and a packet header insertion module (damper header insertion unit).

A process of processing a data packet by the modules included in the network devices is specifically described below with reference to the method 400 for sending a data packet in embodiments of this application.

It is assumed that, it is already known that a maximum delay that may be experienced by the data packet on the network device 1 is $$D_1^{max},$$

a maximum delay that may be experienced by the data packet on the network device 2 is $$D_2^{max},$$

and a maximum delay that may be experienced by the data packet on the network device 3 is $$D_3^{max}.$$

In addition, before the data packet enters the network device 1, a previous-hop device of the network device 1 has added, to the data packet, a remaining processing time of the data packet on the previous-hop device.

The network device 1 processes the received data packet according to the method for sending a data packet in embodiments of this application, and after a preset condition is met, the network device 1 sends the data packet to the network device 2.

After receiving the data packet sent by the network device 1, the network device 2 continues to process the data packet according to the method for sending a data packet in embodiments of this application. However, because the functional modules of the network device 2 do not include a latency equalizer, the data packet can be forwarded on the network device 2 only in a default scheduling manner. Because the functional modules of the network device 2 include the time information capture (packet arrival time capture) module and the packet header insertion module (damper header insertion unit), on the network device 2, a processing time for the data packet to pass the network device 2 (for example, the processing time may be a time between a time at which the data packet enters a switch fabric of the network device 2 and an output moment at which the data packet is output by the network device 2) may be determined by using the time information capture (packet arrival time capture) module, and the processing time is inserted into a packet header of the data packet by using the packet header insertion module (damper header insertion unit). Then the network device 2 sends the data packet to the network device 3 after a preset condition is met.

After the data packet is processed by the network device 1 and the network device 2, time information carried in the data packet is used to indicate a sum of a remaining processing time for the data packet to pass the network device 1 and a remaining processing time for the data packet to pass the network device 2.

After receiving the data packet sent by the network device 2, the network device 3 processes the data packet on the network device 3 based on the time information carried in the data packet and according to the method for sending a data packet in embodiments of this application. An active waiting time of the data packet on the network device 3 includes the sum of the remaining processing time for the data packet to pass the network device 1 and the remaining processing time for the data packet to pass the network device 2.

According to the foregoing method, a function of active waiting of a data packet can be implemented on some network devices (the network device 1 and the network device 3), and a capability of obtaining time information can be implemented on all network devices, so that an end-to-end deterministic delay and jitter can be ensured.

Figure 17:
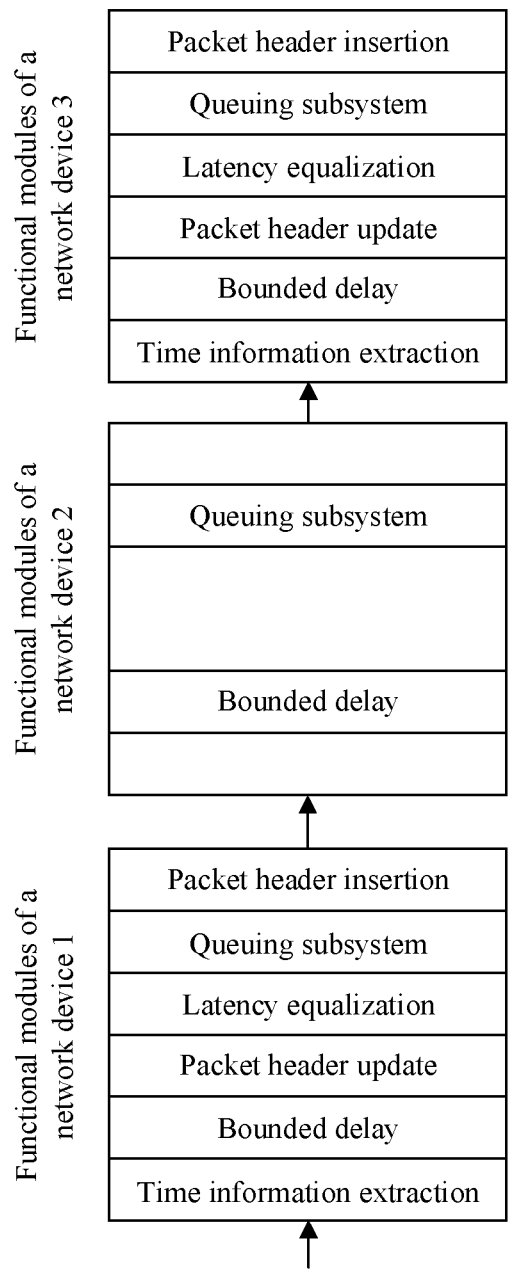
FIG. 17 shows functional modules of another network device for sending a data packet according to an embodiment of this application.

FIG. 17 shows functional modules of a network device for sending a data packet according to an embodiment of this application.

As shown in FIG. 17, three network devices are included: a network device 1, a network device 2, and a network device 3. The network device 1 and the network device 3 each include all the functional modules included in the second network device in FIG. 15. The network device 2 includes only two functional modules included in the second network device in FIG. 15. According to an order in which the modules process a data packet, the two functional modules are sequentially as follows: a bounded delay module (bounded variable delay units) and a queuing subsystem.

A process of processing a data packet by the modules included in the network devices is specifically described below with reference to the method for sending a data packet in embodiments of this application.

It is assumed that, it is already known that a maximum delay that may be experienced by the data packet on the network device 1 is $$D_1^{max},$$

a maximum delay that may be experienced by the data packet on the network device 2 is $$D_2^{max},$$

and a maximum delay that may be experienced by the data packet on the network device 3 is $$D_3^{max}.$$

In addition, before the data packet enters the network device 1, a previous-hop device of the network device 1 has added, to the data packet, a remaining processing time of the data packet on the previous-hop device.

The network device 1 processes the received data packet according to the method for sending a data packet in embodiments of this application, and after a preset condition is met, the network device 1 sends the data packet to the network device 2.

After receiving the data packet sent by the network device 1, the network device 2 schedules the data packet according to a predefined method on the network device 2.

After the data packet is processed by the network device 1 and the network device 2, time information carried in the data packet is used to indicate a remaining processing time for the data packet to pass the network device 1.

After receiving the data packet sent by the network device 2, the network device 3 processes the data packet on the network device 3 based on the time information carried in the data packet and according to the method for sending a data packet in embodiments of this application. An active waiting time of the data packet on the network device 3 is the remaining processing time for the data packet to pass the network device 1.

According to the method provided in this embodiment of this application, it can be determined that a traffic shape of any stream after the any stream leaves a "delay equalization" module of the network device 1 is completely the same as a traffic shape of the any stream when the any stream enters the network device 1. Because traffic characteristics of all streams that pass the network device 1 and the network device 2 are also known, a specific shape of the any stream after the any stream pass the queuing subsystem of the network device 1 and a specific shape of the any stream after the any stream pass the network device 2 may be known. Therefore, a maximum upper bound of a delay of the any stream on the network device 3 may also be calculated.

According to the foregoing method, a function of active waiting of a data packet and a capability of obtaining time information can be implemented on some network devices (the network device 1 and the network device 3), so that an end-to-end deterministic delay and jitter can be ensured.

In this embodiment of this application, a burst degree of a shape of a stream after the stream passes a latency equalizer of the network device 3 becomes larger compared with a shape of the stream after the stream passes the latency equalizer of the network device 1. Compared with the functional modules of the network devices shown in FIG. 16, in this embodiment of this application, an upper bound of a delay of the data packet passing the network device 3 becomes larger, so that an upper bound of an end-to-end delay and an upper bound of an end-to-end jitter become larger.

A second network device provided in this application and a hardware structure of a second network device are described in detail below with reference to FIG. 18 and FIG. 19.

Figure 18:
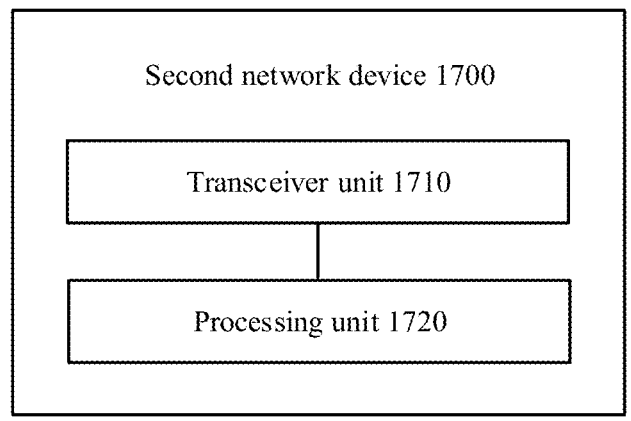
FIG. 18 is a schematic diagram of a structure of a second network device 1700 according to an embodiment of this application.

FIG. 18 is a schematic diagram of a structure of a second network device 1700 according to an embodiment of this application.

As shown in FIG. 18, the second network device 1700 includes a transceiver unit 1710 and a processing unit 1720. The transceiver unit 1710 and the processing unit 1720 may communicate with each other through an internal connection path, to transfer a control signal and/or a data signal.

The transceiver unit 1710 is configured to receive, at a first moment, a data packet sent by a first network device.

The processing unit 1720 is configured to determine a second reference moment based on time information carried in the data packet, where the second reference moment is a reference moment for instructing the data packet to enter a queue in a second queue system, the second queue system is a queue system of the second network device, the time information is used to indicate a first remaining processing time for the data packet to pass the first network device, the first remaining processing time is a difference between a first delay and a first processing time, the first delay is a value not less than an absolute value of a difference between a first theoretical upper time limit and a first transmission time, the first theoretical upper time limit is a theoretical upper processing time limit from a first reference moment to the second reference moment, the first reference moment is a reference moment for instructing the data packet to enter a queue in a first queue system, the first queue system is a queue system of the first network device, the first transmission time is an actual transmission time from a first output moment at which the data packet is output by the first network device to the first moment, and the first processing time is an actual processing time from the first reference moment to the first output moment at which the data packet is output by the first network device.

The processing unit 1720 is further configured to determine, based on the second reference moment, a target queue from a plurality of queues included in the second queue system, and adds the data packet to the target queue.

The processing unit 1720 is further configured to send the data packet to a third network device according to a scheduling rule corresponding to the second queue system.

In some embodiments, the plurality of queues included in the second queue system are in a one-to-one correspondence with a plurality of preset moments, a difference between any two adjacent preset moments of the plurality of preset moments is a first value, and the processing unit 1720 is further configured to:

determine, based on the second reference moment, that one queue corresponding to a first target moment among the plurality of queues included in the second queue system is the target queue, where the first target moment is a sum of the second reference moment and a second value, the second value is an absolute value of a difference between the second reference moment and a third moment plus an integer multiple of the first value, any one of the plurality of preset moments is not included between the second reference moment and the third moment, and the first target moment is one moment of the plurality of preset moments.

In some embodiments, the processing unit 1720 is further configured to determine the second reference moment based on the first delay and the first processing time.

In some embodiments, the processing unit 1720 is further configured to determine the second reference moment based on the first delay, the first reference moment, the first output moment at which the data packet is output by the first network device, and the first moment.

In some embodiments, the processing unit 1720 is further configured to determine the second reference moment based on the following formula:

$$E^2 = t_{in}^2 + D_1^{max} - (t_{out}^1 - E^1),$$

where
$E^2$ is the second reference moment, $$t_{in}^2$$

is the first moment, $$D_1^{max}$$

is the first delay, $$t_{out}^1$$

is the first output moment at which the data packet is output by the first network device, and $E^1$ is the first reference moment.

In some embodiments, the processing unit 1720 is further configured to:

determine the second reference moment based on the first delay, the first reference moment, the first output moment at which the data packet is output by the first network device, a moment at which a switch fabric of the second network device completes processing the data packet, and the first moment, where the moment at which the switch fabric of the second network device completes processing the data packet is earlier than the second reference moment.

In some embodiments, the processing unit 1720 is further configured to determine the second reference moment based on the following formula:

$$E^2 = t_{in}'^2 + [D_1^{max} - (t_{out}^1 - E^1)] - t_{in}'^2 - t_{in}^2),$$

where
$E^2$ is the second reference moment, $$t_{in}'^2$$

is the moment at which the switch fabric of the second network device completes processing the data packet, $$D_1^{max}$$

is the first delay, $$t_{out}^1$$

is the first output moment at which the data packet is output by the first network device, $E^1$ is the first reference moment, and $$t_{in}^2$$

is the first moment.

In some embodiments, the time information includes a first time value, and the first time value is the first remaining processing time.

In some embodiments, the time information includes first indication information, and the first indication information is used to indicate the first processing time.

In some embodiments, the first indication information includes a second time value, and the second time value is the first processing time.

In some embodiments, the first indication information includes a third time value and a fourth time value, the third time value is the first output moment at which the data packet is output by the first network device, and the fourth time value is the first reference moment.

In some embodiments, the time information further includes second indication information, and the second indication information is used to indicate the first delay.

In some embodiments, the processing unit 1720 is further configured to determine that the target queue is a queue scheduled at a current moment among the plurality of queues included in the second queue system and that the target queue is in an enabled state; and the transceiver unit 1710 is further configured to send the data packet to a third network device according to a scheduling rule corresponding to the second queue system.

In some embodiments, the processing unit 1720 is further configured to: when the target queue meets a first preset condition, determine to disable the target queue.

In some embodiments, the processing unit 1720 is further configured to determine a second target moment based on first information, where the second target moment corresponds to the target queue, the second target moment is an enabling moment that corresponds to the target queue and that is later than the first target moment, the second target moment is later than any one of the plurality of preset moments, and the first information includes a scheduling order corresponding to each queue included in the second queue system and an enabling moment corresponding to each queue included in the second queue system; and the plurality of queues included in the second queue system are in a one-to-one correspondence with the plurality of preset moments, the difference between any two adjacent preset moments of the plurality of preset moments is the first value, the one queue corresponding to the first target moment among the plurality of queues included in the second queue system is the target queue, the first target moment is the sum of the second reference moment and the second value, the second value is the absolute value of the difference between the second reference moment and the third moment plus the integer multiple of the first value, any one of the plurality of preset moments is not included between the second reference moment and the third moment, the third moment is one moment of the plurality of preset moments, and the first target moment is one moment of the plurality of preset moments.

In some embodiments, the processing unit 1720 is further configured to:

when determining that the target queue is a queue with a highest priority among the plurality of queues included in the second queue system, determine that the target queue is the queue scheduled at the current moment among the plurality of queues included in the second queue system; and set a priority of the target queue to a queue with a lowest priority among the plurality of queues included in the second queue system, and increase a priority of a queue other than the target queue among the plurality of queues included in the second queue system.

In some embodiments, the plurality of queues included in the second queue system are in a one-to-one correspondence with a plurality of preset scheduling orders, and the processing unit 1720 is further configured to: when determining, according to the plurality of preset scheduling orders, that a preset scheduling order corresponding to the target queue is a scheduling order corresponding to the queue scheduled by the second network device at the current moment, determine that the target queue is the queue scheduled at the current moment among the plurality of queues included in the second queue system.

In some embodiments, the first preset condition includes: the target queue is an empty queue, enabled duration of the target queue is greater than or equal to the first value, the first value is the difference between any two adjacent preset moments of the plurality of preset moments, the plurality of preset moments are in a one-to-one correspondence with the plurality of queues included in the second queue system.

Figure 19:
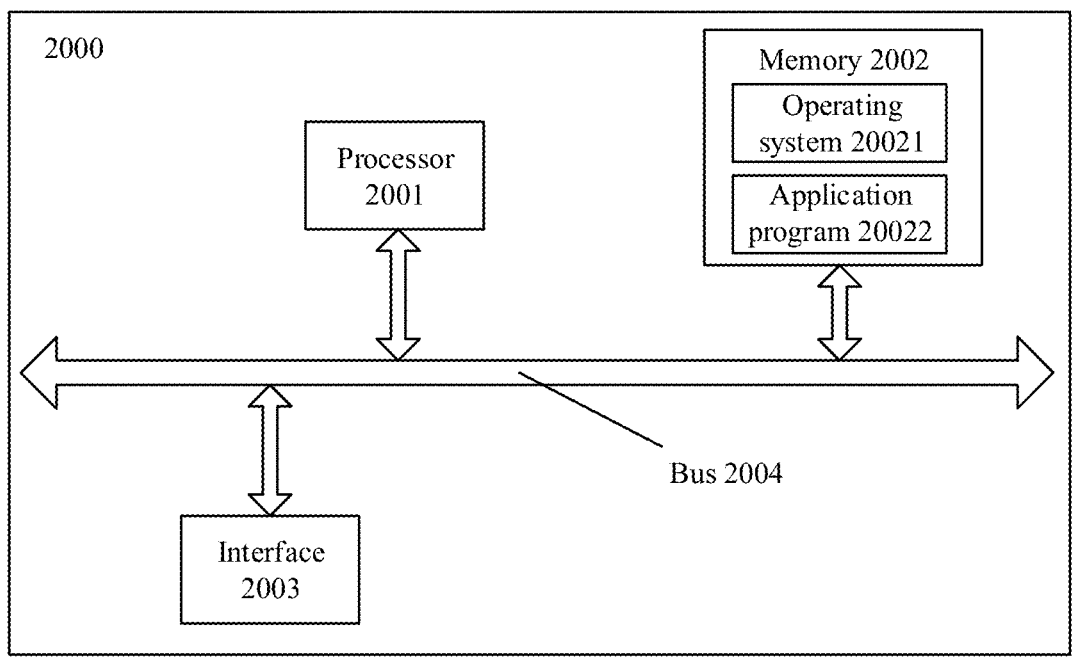
FIG. 19 is a schematic diagram of a hardware structure of a second network device 2000 according to an embodiment of this application.

FIG. 19 is a schematic diagram of a hardware structure of a second network device 2000 according to an embodiment of this application. The second network device 2000 shown in FIG. 19 may perform corresponding operations that are performed by the second network device in the methods in the foregoing embodiments.

As shown in FIG. 19, the second network device 2000 includes a processor 2001, a memory 2002, an interface 2003, and a bus 2004. The interface 2003 may be implemented in a wireless or wired manner. Specifically, the interface 2003 may be a network interface card. The processor 2001, the memory 2002, and the interface 2003 are connected by using the bus 2004.

The interface 2003 may specifically include a transmitter and a receiver, and is specifically used by the second network device to implement the foregoing sending and receiving. For example, the interface 2003 is configured to receive, at a first moment, a data packet sent by a first network device; and is further configured to send the data packet to a third network device according to a scheduling rule corresponding to a second queue system.

The processor 2001 is configured to perform processing that is performed by the second network device in the foregoing embodiments. For example, the processor is configured to determine a second reference moment based on time information carried in the data packet; is further configured to determine, based on the second reference moment, a target queue from a plurality of queues included in the second queue system, and add the data packet to the target queue; and is further configured to send the data packet to the third network device according to the scheduling rule corresponding to the second queue system; and/or is used for other processes of the technologies described in this specification. The memory 2002 includes an operating system 20021 and an application program 20022, and is configured to store programs, code, or computer executable instructions. When the processor or a hardware device executes the programs, the code, or the computer executable instructions, the processing processes related to the second network device in the method embodiments may be performed. In an embodiment, the memory 2002 may include a read-only memory (ROM) and a random access memory (RAM). The ROM includes a basic input/output system (BIOS) or an embedded system. The RAM includes an application program and an operating system. When the second network device 2000 needs to operate, the second network device 2000 may be started by using a bootloader boot system in the BIOS or the embedded system that is solidified in the ROM, to guide the second network device 2000 into a normal operating state. After the second network device 2000 enters the normal operating state, the application program and the operating system in the RAM are run, to perform the processing processes related to the second network device in the method embodiments.

It can be understood that FIG. 19 shows merely a simplified design of the second network device 2000. In actual application, the second network device may include any quantity of interfaces, processors, or memories.

An embodiment of this application further provides a computer-readable medium. The computer-readable medium stores program code. When the program code is run on a computer, the computer is enabled to perform the methods in the foregoing aspects. The computer-readable medium includes but is not limited to one or more of the following: a read-only memory (ROM), a programmable ROM (PROM), an erasable PROM (EPROM), a flash memory, an electrically EPROM (EEPROM), and a hard disk drive.

An embodiment of this application further provides a chip system, used in a second network device. The chip system includes at least one processor, at least one memory, and an interface circuit. The interface circuit is responsible for information exchange between the chip system and an external environment. The at least one memory, the interface circuit, and the at least one processor are interconnected through a line. The at least one memory stores computer executable instructions. The computer executable instructions are executed by the at least one processor, to perform the operations of the second network device in the methods in the foregoing aspects.

In a specific implementation process, the chip system may be implemented in a form of a central processing unit (CPU), a micro controller (MCU), a micro processing unit (MPU), a digital signal processor (DSP), a system on chip (SoC), an application-specific integrated circuit (ASIC), a field programmable gate array (FPGA), or a programmable logic device (PLD).

An embodiment of this application further provides a computer program product, used in a second network device. The computer program product includes a series of computer executable instructions. When the computer executable instructions are run, the operations of the second network device in the methods in the foregoing aspects are performed.

It should be understood that sequence numbers of the foregoing processes do not mean execution sequences in embodiments of this application. The execution sequences of the processes should be determined based on functions and internal logic of the processes, and should not constitute any limitation on implementation processes of the embodiments of this application.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several computer execution instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for sending a data packet, comprising:
receiving, by a second network device at a first moment, a data packet sent by a first network device;
determining, by the second network device, a second reference moment based on time information carried in the data packet, wherein the second reference moment is a reference moment for instructing the data packet to enter a queue in a second queue system, the second queue system is a queue system of the second network device, the time information is used to indicate a first remaining processing time for the data packet to pass the first network device, the first remaining processing time is a difference between a first delay and a first processing time, the first delay is a value not less than an absolute value of a difference between a first theoretical upper time limit and a first transmission time, the first theoretical upper time limit is a theoretical upper processing time limit from a first reference moment to the second reference moment, the first reference moment is a reference moment for instructing the data packet to enter a queue in a first queue system, the first queue system is a queue system of the first network device, the first transmission time is an actual transmission time from a first output moment at which the data packet is output by the first network device to the first moment, and the first processing time is an actual processing time from the first reference moment to the first output moment at which the data packet is output by the first network device;
determining, by the second network device based on the second reference moment, a target queue from a plurality of queues comprised in the second queue system, and adding the data packet to the target queue; and sending, by the second network device, the data packet to a third network device according to a scheduling rule corresponding to the second queue system.

2. The method according to claim 1, wherein the plurality of queues comprised in the second queue system are in a one-to-one correspondence with a plurality of preset moments, a difference between any two adjacent preset moments of the plurality of preset moments is a first value, and the determining, by the second network device based on the second reference moment, a target queue from a plurality of queues comprised in the second queue system comprises:
determining, by the second network device based on the second reference moment, that one queue corresponding to a first target moment among the plurality of queues comprised in the second queue system is the target queue, wherein the first target moment is a sum of the second reference moment and a second value, the second value is an absolute value of a difference between the second reference moment and a third moment plus an integer multiple of the first value, any one of the plurality of preset moments is not comprised between the second reference moment and the third moment, the third moment is one moment of the plurality of preset moments, the third moment is later than the second reference moment, and the first target moment is one moment of the plurality of preset moments.

3. The method according to claim 1, wherein the determining, by the second network device, a second reference moment based on time information carried in the data packet comprises:
determining, by the second network device, the second reference moment based on the first delay and the first processing time.

4. The method according to claim 3, wherein the determining, by the second network device, the second reference moment based on the first delay and the first processing time comprises:
determining, by the second network device, the second reference moment based on the first delay, the first reference moment, the first output moment at which the data packet is output by the first network device, and the first moment.

5. The method according to claim 4, wherein the determining, by the second network device, the second reference moment based on the first delay, the first reference moment, the first output moment at which the data packet is output by the first network device, and the first moment comprises: determining, by the second network device, the second reference moment based on the following formula:

$$E^2 = t_{in}^2 + D_1^{max} - (t_{out}^1 - E^1),$$

wherein
$E^2$ is the second reference moment, $$t_{in}^2$$

is the first moment, $$D_1^{max}$$

is the first delay, $$t_{out}^1$$

is the first output moment at which the data packet is output by the first network device, and $E^1$ is the first reference moment.

6. The method according to claim 3, wherein the determining, by the second network device, the second reference moment based on the first delay and the first processing time comprises:
determining, by the second network device, the second reference moment based on the first delay, the first reference moment, the first output moment at which the data packet is output by the first network device, a moment at which a switch fabric of the second network device completes processing the data packet, and the first moment, wherein the moment at which the switch fabric of the second network device completes processing the data packet is earlier than the second reference moment.

7. The method according to claim 6, wherein the determining, by the second network device, the second reference moment based on the first delay, the first reference moment, the first output moment at which the data packet is output by the first network device, a moment at which a switch fabric of the second network device completes processing the data packet, and the first moment comprises: determining, by the second network device, the second reference moment based on the following formula:

$$E^2 = t_{in}^{\prime 2} + [D_1^{max} - (t_{out}^1 - E^1)] - (t_{in}^{\prime 2} - t_{in}^2),$$

wherein
$E^2$ is the second reference moment, $$t_{in}^{\prime 2}$$

is the moment at which the switch fabric of the second network device completes processing the data packet, $$D_1^{max}$$

is the first delay, $$t_{out}^1$$

is the first output moment at which the data packet is output by the first network device, $E^1$ is the first reference moment, and $$t_{in}^2$$

is the first moment.

8. The method according to claim 1, wherein
the time information comprises a first time value, and the first time value is the first remaining processing time.

9. The method according to claim 1, wherein
the time information comprises first indication information, and the first indication information is used to indicate the first processing time.

10. The method according to claim 9, wherein
the first indication information comprises a second time value, and the second time value is the first processing time.

11. A second network device, comprising:
one or more processors; and
a non-transitory computer-readable memory storing a program to be executed by the one or
more processors, the program including instructions that, when executed by the one or more processors, cause the second network device to:
receive, at a first moment, a data packet sent by a first network device; and
determine a second reference moment based on time information carried in the data packet, wherein the second reference moment is a reference moment for instructing the data packet to enter a queue in a second queue system, the second queue system is a queue system of the second network device, the time information is used to indicate a first remaining processing time for the data packet to pass the first network device, the first remaining processing time is a difference between a first delay and a first processing time, the first delay is a value not less than an absolute value of a difference between a first theoretical upper time limit and a first transmission time, the first theoretical upper time limit is a theoretical upper processing time limit from a first reference moment to the second reference moment, the first reference moment is a reference moment for instructing the data packet to enter a queue in a first queue system, the first queue system is a queue system of the first network device, the first transmission time is an actual transmission time from a first output moment at which the data packet is output by the first network device to the first moment, and the first processing time is an actual processing time from the first reference moment to the first output moment at which the data packet is output by the first network device, wherein
determine, based on the second reference moment, a target queue from a plurality of queues comprised in the second queue system, and add the data packet to the target queue; and
send the data packet to a third network device according to a scheduling rule corresponding to the second queue system.

12. The second network device according to claim 11, wherein the plurality of queues comprised in the second queue system are in a one-to-one correspondence with a plurality of preset moments; and
wherein the program further comprises instructions that cause the second network device to:
determine, based on the second reference moment, that one queue corresponding to a first target moment among the plurality of queues comprised in the second queue system is the target queue, wherein the first target moment is a sum of the second reference moment and a second value, the second value is an absolute value of a difference between the second reference moment and a third moment plus an integer multiple of a first value, any one of the plurality of preset moments is not comprised between the second reference moment and the third moment, the third moment is one moment of the plurality of preset moments, the third moment is later than the second reference moment, and the first target moment is one moment of the plurality of preset moments.

13. The second network device according to claim 11, wherein the program further comprises instructions that cause the second network device to:
determine the second reference moment based on the first delay and the first processing time.

14. The second network device according to claim 13, wherein the program further comprises instructions that cause the second network device to:
determine the second reference moment based on the first delay, the first reference moment, the first output moment at which the data packet is output by the first network device, and the first moment.

15. The second network device according to claim 14, wherein the program further comprises instructions that cause the second network device to:
determine the second reference moment based on the following formula:

$$E^2 = t_{in}^2 + D_1^{max} - (t_{out}^1 - E^1),$$

wherein
$E^2$ is the second reference moment, $t_{in}^2$ is the first moment, $D_1^{max}$ is the first delay, $t_{out}^1$ is the first output moment at which the data packet is output by the first network device, and $E^1$ is the first reference moment.

16. The second network device according to claim 13, wherein the program further comprises instructions that cause the second network device to:
determine the second reference moment based on the first delay, the first reference moment, the first output moment at which the data packet is output by the first network device, a moment at which a switch fabric of the second network device completes processing the data packet, and the first moment, wherein the moment at which the switch fabric of the second network device completes processing the data packet is earlier than the second reference moment.

17. The second network device according to claim 16, wherein the program further comprises instructions that cause the second network device to:

determine the second reference moment based on the following formula:

$$E^2 = t'^2_{in} + [D^{max}_1 - (t^1_{out} - E^1)] - (t'^2_{in} - t^2_{in}),$$

wherein
$E^2$ is the second reference moment, $t'^2_{in}$ is the moment at which the switch fabric of the second network device completes processing the data packet, $D^{max}_1$ is the first delay, $t^1_{out}$ is the first output moment at which the data packet is output by the first network device, $E^1$ is the first reference moment, and $t^2_{in}$ is the first moment.

18. The second network device according to claim 11, wherein
the time information comprises a first time value, and the first time value is the first remaining processing time.

19. The second network device according to claim 11, wherein
the time information comprises first indication information, and the first indication information is used to indicate the first processing time.

20. The second network device according to claim 19, wherein
the first indication information comprises a second time value, and the second time value is the first processing time.

* * * * *